US011518710B2

(12) United States Patent
Thostenson et al.

(10) Patent No.: US 11,518,710 B2
(45) Date of Patent: Dec. 6, 2022

(54) SENSOR FORMED FROM CONDUCTIVE NANOPARTICLES AND A POROUS NON-CONDUCTIVE SUBSTRATE

(71) Applicant: University of Delaware, Newark, DE (US)

(72) Inventors: Erik Thostenson, Newark, DE (US); Thomas Schumacher, Portland, OR (US)

(*) Notice: Subject to any disclaimer, the term of this patent is extended or adjusted under 35 U.S.C. 154(b) by 40 days.

(21) Appl. No.: 16/990,117

(22) Filed: Aug. 11, 2020

(65) Prior Publication Data
US 2020/0369564 A1 Nov. 26, 2020

Related U.S. Application Data

(60) Continuation of application No. 15/672,931, filed on Aug. 9, 2017, now Pat. No. 10,745,320, which is a division of application No. 14/606,292, filed on Jan. 27, 2015, now Pat. No. 9,776,916.

(60) Provisional application No. 61/941,686, filed on Feb. 19, 2014, provisional application No. 61/932,465, filed on Jan. 28, 2014.

(51) Int. Cl.
| | |
|---|---|
| C08K 3/04 | (2006.01) |
| C09D 5/44 | (2006.01) |
| C09D 7/61 | (2018.01) |
| C03C 25/44 | (2006.01) |
| C25D 13/02 | (2006.01) |

(Continued)

(52) U.S. Cl.
CPC ............ *C03C 25/44* (2013.01); *C09D 5/4419* (2013.01); *C25D 13/02* (2013.01); *C25D 13/12* (2013.01); *C25D 13/22* (2013.01); *C08K 3/041* (2017.05); *C08K 3/042* (2017.05); *C09D 7/61* (2018.01); *Y10T 428/254* (2015.01)

(58) Field of Classification Search
None
See application file for complete search history.

(56) References Cited

U.S. PATENT DOCUMENTS 3,648,165 A * 3/1972 Shawhan .............. G01F 23/266
324/677
6,034,778 A * 3/2000 Shin ..................... G01B 11/303
356/600

(Continued)

OTHER PUBLICATIONS

Arndt, R. W., Schumacher, T., Algernon, D., and Kee, S.-H. (2011). Strategien der Bauwerkserhaltung von Autobahnbrücken in den USA-mit Unterstützung von zerstörungsfreier Prüfung und Bauwerksmonitoring (English title: Strategies for Maintenance of Highway Bridges in the US-with the Support of Nondestructive Testing and Structural Health Monitoring). Bautechnik. vol. 88(11), pp. 793-804.

*Primary Examiner* — Alexander M Weddle
(74) *Attorney, Agent, or Firm* — Cardle Patent Law CHTD

(57) ABSTRACT

In various aspects, the sensors include a substrate that is porous and non-conductive with nanoparticles deposited onto the substrate within pores of the substrate by an electrophoretic process to form a sensor element. The nanoparticles are electrically conductive. The sensor includes a detector in communication with the sensor element to measure a change in an electrical property of the sensor element. The change in the electrical property may result from alterations in quantum tunneling between nanoparticles within the sensor element, in various aspects.

20 Claims, 17 Drawing Sheets

(51) Int. Cl.
*C25D 13/12* (2006.01)
*C25D 13/22* (2006.01)

(56) References Cited

U.S. PATENT DOCUMENTS

| | | | |
|---|---|---|---|
| 9,776,916 B2 | 10/2017 | Thostenson | |
| 10,745,320 B2 | 8/2020 | Thostenson | |
| 2004/0119055 A1* | 6/2004 | Li | C04B 35/4521 |
| | | | 252/500 |
| 2004/0245463 A1 | 12/2004 | Wood et al. | |
| 2009/0303660 A1* | 12/2009 | Nair | H01G 11/46 |
| | | | 361/502 |
| 2012/0028798 A1* | 2/2012 | Worsley | B82Y 40/00 |
| | | | 252/502 |
| 2013/0299448 A1* | 11/2013 | Stolovitzky | B82Y 40/00 |
| | | | 216/2 |
| 2014/0271366 A1* | 9/2014 | Denomme | G01N 33/54373 |
| | | | 422/69 |
| 2018/0319943 A1* | 11/2018 | Liu | C09D 169/00 |

* cited by examiner

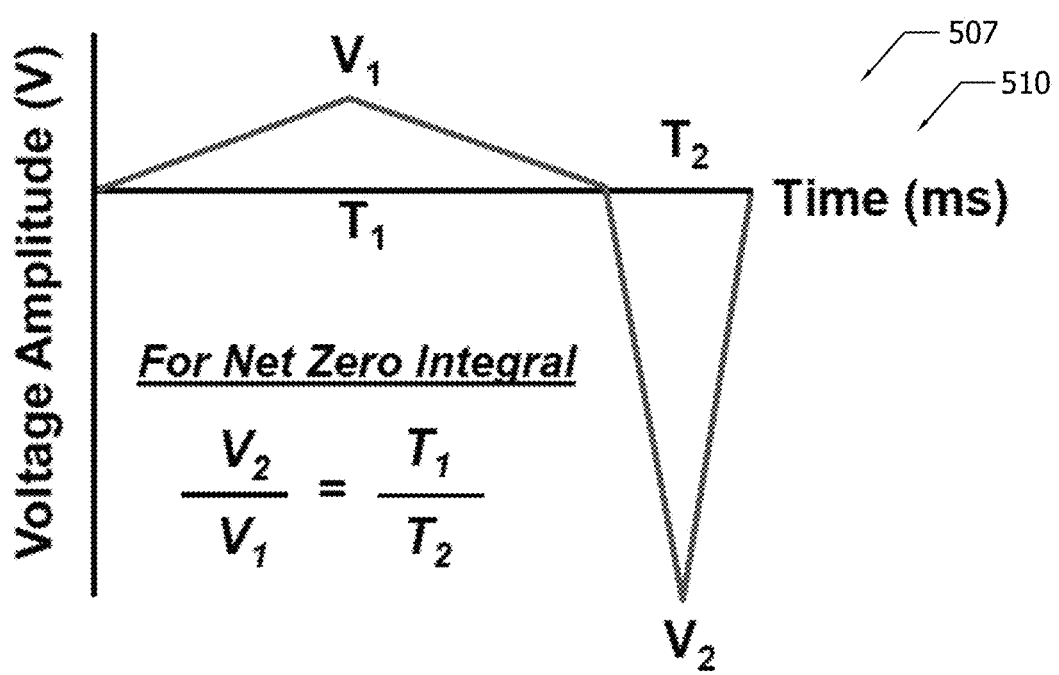
Fig. 4F Triangular asymmetric wave form with a net zero integral

Fig. 6A, 6B, 6C, 6D (clockwise from upper left) SEM images of E-glass fiber after EPD coating with ozone and PEI functionalized MWCNTs indicating A) the outer fiber surface, B) a cross-section through the outer coating, C&D) coating toward the fiber tow interior.

Fig. 7A, 7B, 7C, 7D (clockwise from upper left) SEM cross-sectional images of E-glass fabric after EPD coating with ozone and PEI functionalized MWCNTs and resin infusion showing A, B) the outer fiber surface, C&D) the distribution of coating for the interior fibers.

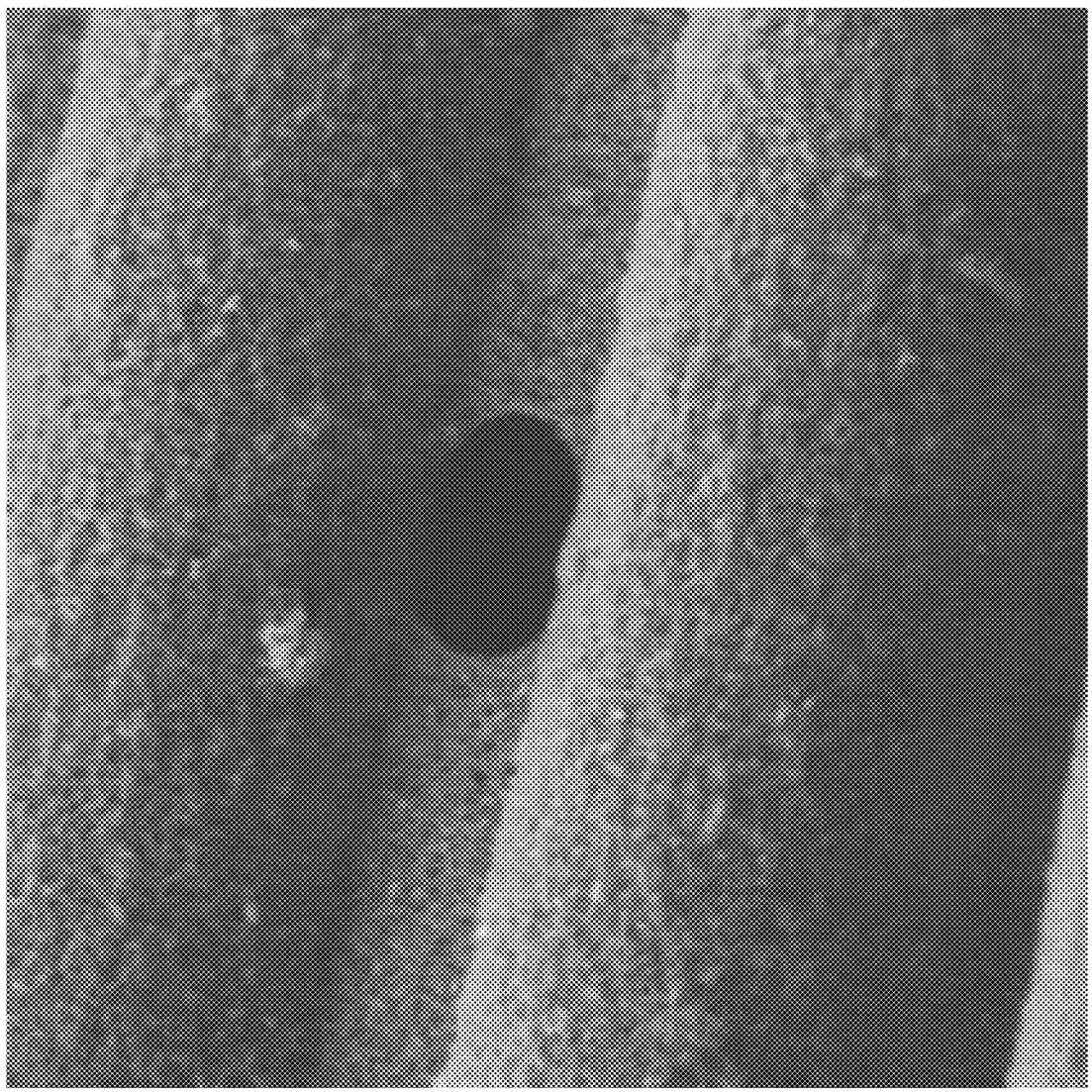
Fig. 8A Micrograph showing porosity

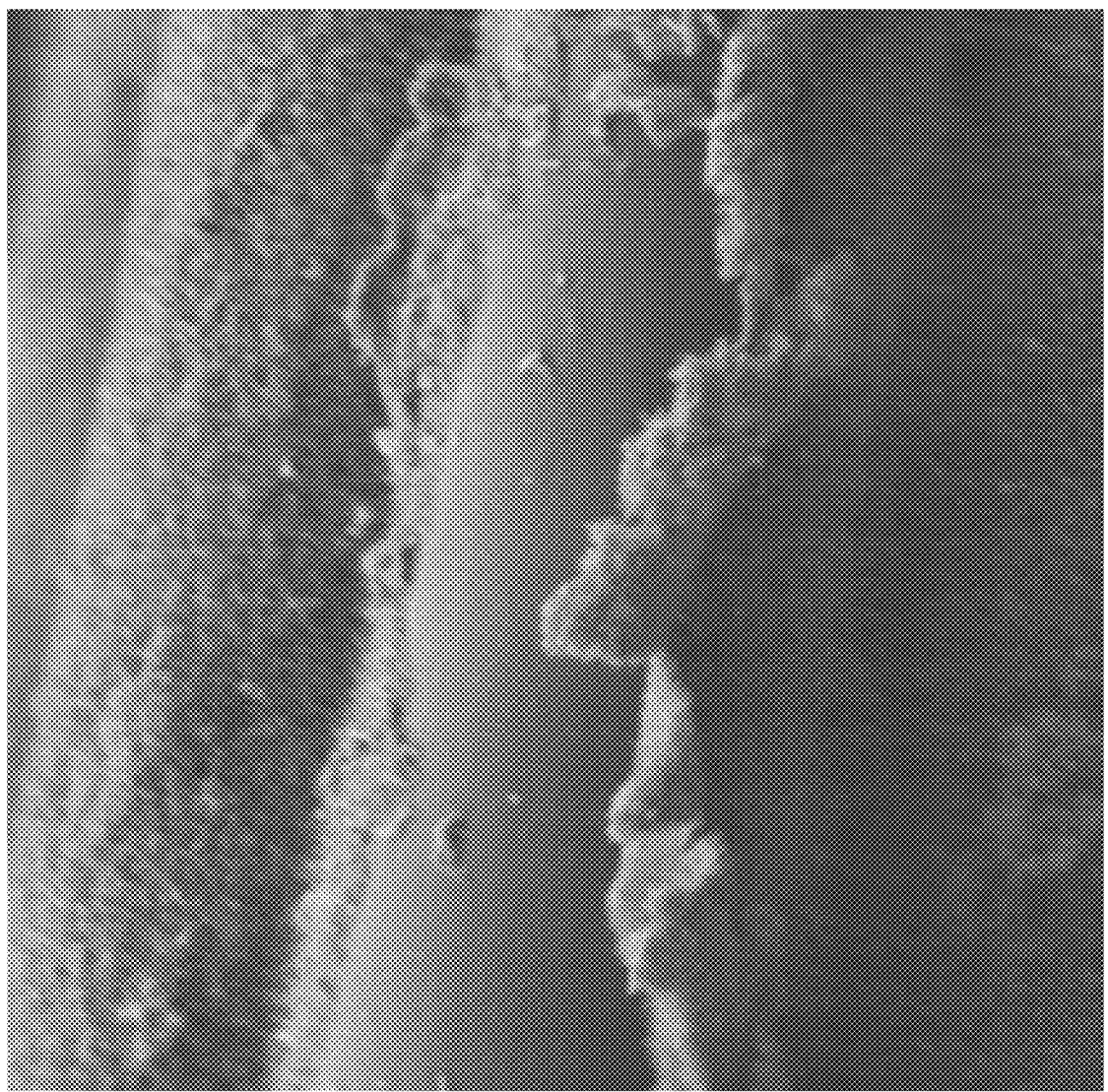
Fig. 8B Micrograph showing spalling.

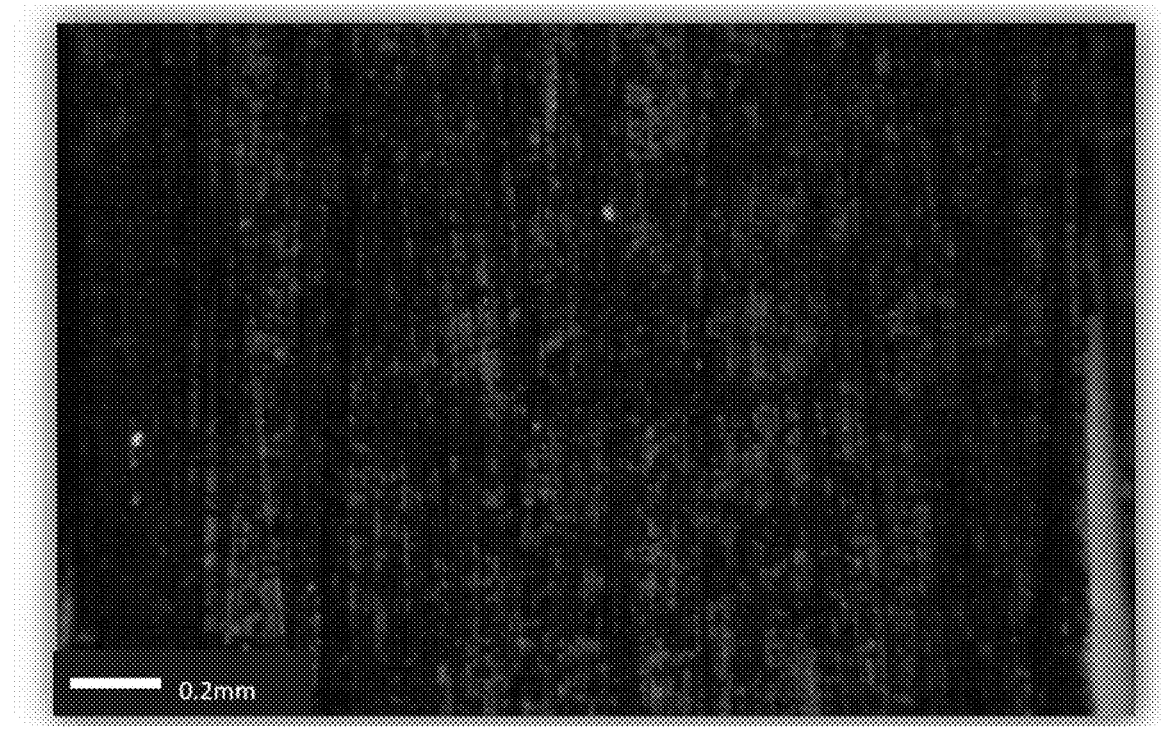
Fig. 9A Optical micrograph of carbon nanotubes on glass fibers showing the coverage and distribution of material
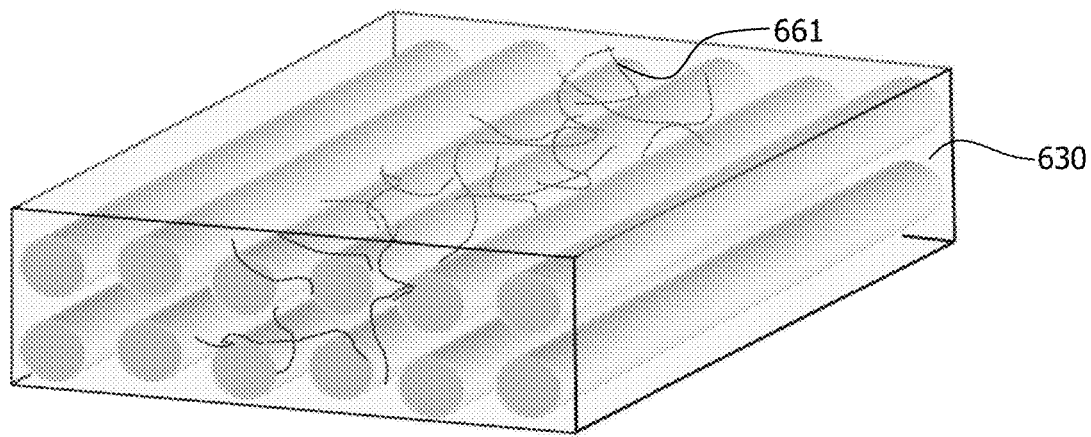
FIG. 9B

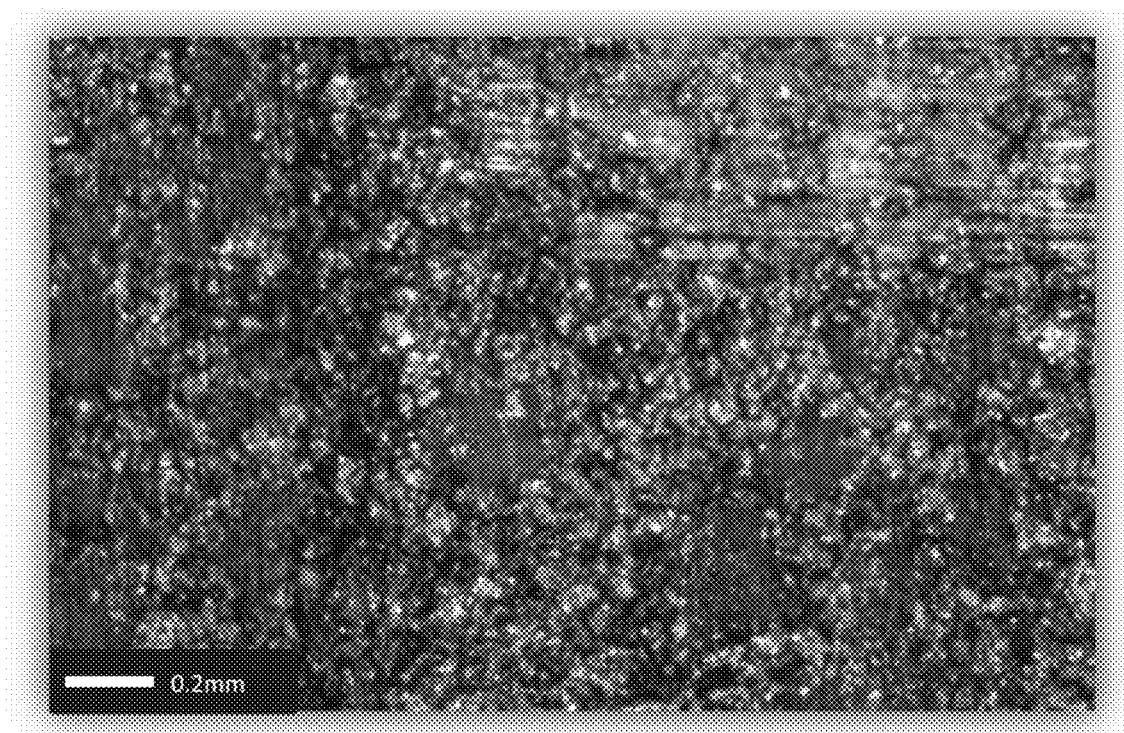
Fig. 10A Optical micrograph of xGnP on glass fibers showing the coverage and distribution of material
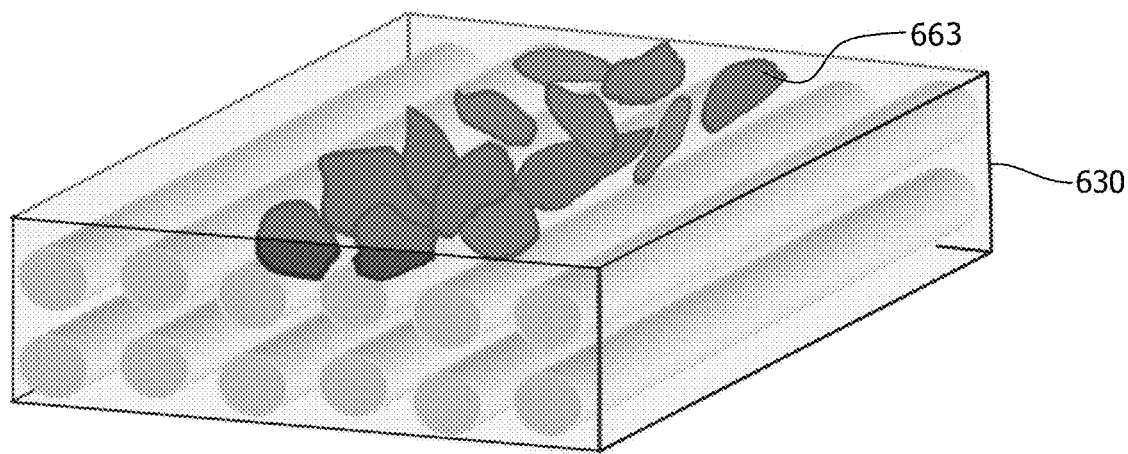
FIG. 10B

SENSOR FORMED FROM CONDUCTIVE NANOPARTICLES AND A POROUS NON-CONDUCTIVE SUBSTRATE

CROSS-REFERENCE TO RELATED APPLICATIONS

This patent application is a continuation of co-pending U.S. patent application Ser. No. 15/672,931 filed 9 Aug. 2017, which is a divisional of prior U.S. patent application Ser. No. 14/606,292 filed 27 Jan. 2015 (now U.S. Pat. No. 9,776,916) that, in turn, claims priority and benefits of U.S. Provisional Patent Application 61/932,465 filed 28 Jan. 2014 and U.S. Provisional Patent Application 61/941,686 filed 19 Feb. 2014, all of which are hereby incorporated by reference in their entireties herein.

STATEMENT REGARDING FEDERALLY SPONSORED RESEARCH

This invention was made with government support awarded by the National Science Foundation under grant #1234830 and #1254540/ARL #W911NF-07-2-0026/W911NF-06-2-0011 and by DTFH61-13-H-00010 from the Federal Highway Administration. The government has certain rights in the invention.

BACKGROUND OF THE INVENTION

Field

The present disclosure relates to the deposition of nanoparticles on substrates, and, more particularly, to the deposition of nanoparticles on electrically non-conductive substrates including the formation of bonds between the nanoparticles and substrates.

Background

There has been broad scientific and technical interest in producing nanostructured composite material systems that exploit the unique properties of nanoparticles in engineering applications. The selective and intelligent integration of nanoparticles by hybridizing with various substrates enables the ability to form local multi-scale architectures for the tailoring of both mechanical and physical properties such as mechanical strength, electrical conductivity, or thermal conductivity of the nanoparticle-substrate combination.

For example, the direct hybridization where nanoparticles fully penetrate the fiber bundles of a textile, the textile forming the substrate, may be utilized as conductors for integrating sensors into the textile.

Advanced fiber-reinforced composites, such as carbon fiber reinforced polymer (CFRP) and glass fiber reinforced polymer (GFRP) composites may offer improved in-plane tensile properties for their equivalent weight in comparison with traditional metallic materials. However, Advanced fiber-reinforced composites may exhibit poor through-thickness strength and toughness properties. Previous efforts to improve the through-thickness properties of Advanced fiber-reinforced composites, for example, have examined the addition of nanoparticles such as carbon nanotubes to a substrate comprising carbon fibers. Carbon nanotubes offer high strength and stiffness on a sub-micron scale and, therefore are potential candidates to be used to modify the interstitial regions between the carbon fibers where the polymer matrix dominates the composite strength and toughness properties.

Chemical vapor deposition processes have been used for incorporating carbon nanotubes into CFRP composites by growing CNTs directly upon the reinforcing fiber using chemical vapor deposition prior to resin infusion. The chemical vapor deposition process enables carbon nanotubes to be grown at high coverage, leading to high-effective volume fraction of the carbon nanotubes in the matrix.

Chemical vapor deposition processes may cause a reduction in the strength of the carbon fibers as well as of various non-conductive fibers, and, therefore, compromise the tensile properties. For example, chemical vapor deposition may remove sizing(s) disposed about the surface of the fibers that prevent stress corrosion cracking of the fibers or that confer ultra violet light (UV light) protection to the fibers. Removal of the sizing(s) may accordingly degrade the mechanical and physical properties of the fibers, for example, due to increased stress corrosion cracking or degradation by UV light. While the chemical vapor deposition process may be scalable, the high temperatures that may be employed for chemical vapor deposition, for example, between 600° C. and 1,000° C., makes the chemical vapor deposition process energy intensive. The chemical vapor deposition process may also be less amenable to the control of carbon nanotubes purity and manipulation of surface chemistry and adhesion of the carbon nanotubes to the surface of the substrate. Furthermore, the high temperatures of the chemical vapor deposition process may make this process inapplicable to various electrically non-conductive substrates.

Dispersion/infusion approaches have been used for incorporating carbon nanotubes into CFRP composites by inclusion of the CNT within the polymer matrix. CNT volume fraction may be limited to be generally less than 1% because processing high carbon nanotubes volumes in the polymer may be difficult due to factors such as viscosity increases, fabric filtering effects, and adequate dispersion.

Accordingly, there is a need for improved processes as well as related apparatus and compositions of matter that incorporate nanoparticles with various substrates including electrically non-conductive substrates.

BRIEF SUMMARY OF THE INVENTION

These and other needs and disadvantages may be overcome by the processes and related apparatus and compositions of matter disclosed herein. Additional improvements and advantages may be recognized by those of ordinary skill in the art upon study of the present disclosure.

In various aspects, the processes disclosed herein may include the steps of inducing an electric field about a non-conductive substrate, and depositing functionalized nanoparticles upon the non-conductive substrate by contacting a nanoparticle dispersion with the non-conductive substrate, the nanoparticle dispersion comprising functionalized nanoparticles having an electrical charge, the electric field drawing the functionalized nanoparticles to the non-conductive substrate.

In various aspects, the related composition of matter disclosed herein comprise functionalized nanoparticles bonded to a surface of a non-conductive fiber, the surface of the non-conductive fiber comprising a sizing adhered to the surface of the non-conductive fiber.

In various aspects, a sensor element comprises nanoparticles deposited onto the substrate within pores of the substrate. In various aspects, a detector is in operable communication with the sensor element to measure a change in an electrical property of the sensor element.

This summary is presented to provide a basic understanding of some aspects of the processes and related apparatus and compositions of matter disclosed herein as a prelude to the detailed description that follows below. Accordingly, this summary is not intended to identify key elements of the processes and related apparatus and compositions of matter disclosed herein or to delineate the scope thereof.

BRIEF DESCRIPTION OF THE DRAWINGS

FIG. 4F illustrates by Cartesian plot an exemplary waveform having a net zero integral as may be generated in the exemplary implementation of an electrophoresis apparatus of FIG. 4E;

FIG. 8A constitutes SEM images of the surfaces of glass fibers coated with functionalized MWCNTs as fabricated in exemplary Example 2 and showing porosity;

FIG. 8B constitutes SEM images of the surfaces of glass fibers coated with functionalized MWCNTs as fabricated in exemplary Example 2 and showing spalling;

FIG. 9A constitutes an optical micrograph of MWCNTs deposited upon glass fibers as fabricated in exemplary Example 4;

FIG. 9B illustrates schematically an exemplary distribution of MWCNTs deposited upon glass fibers as fabricated in exemplary Example 4;

FIG. 10A constitutes an optical micrograph of xGnP deposited upon glass fibers as fabricated in exemplary Example 4;

FIG. 10B illustrates schematically an exemplary distribution of xGnP deposited upon glass fibers as fabricated in exemplary Example 4;

Figure 1:
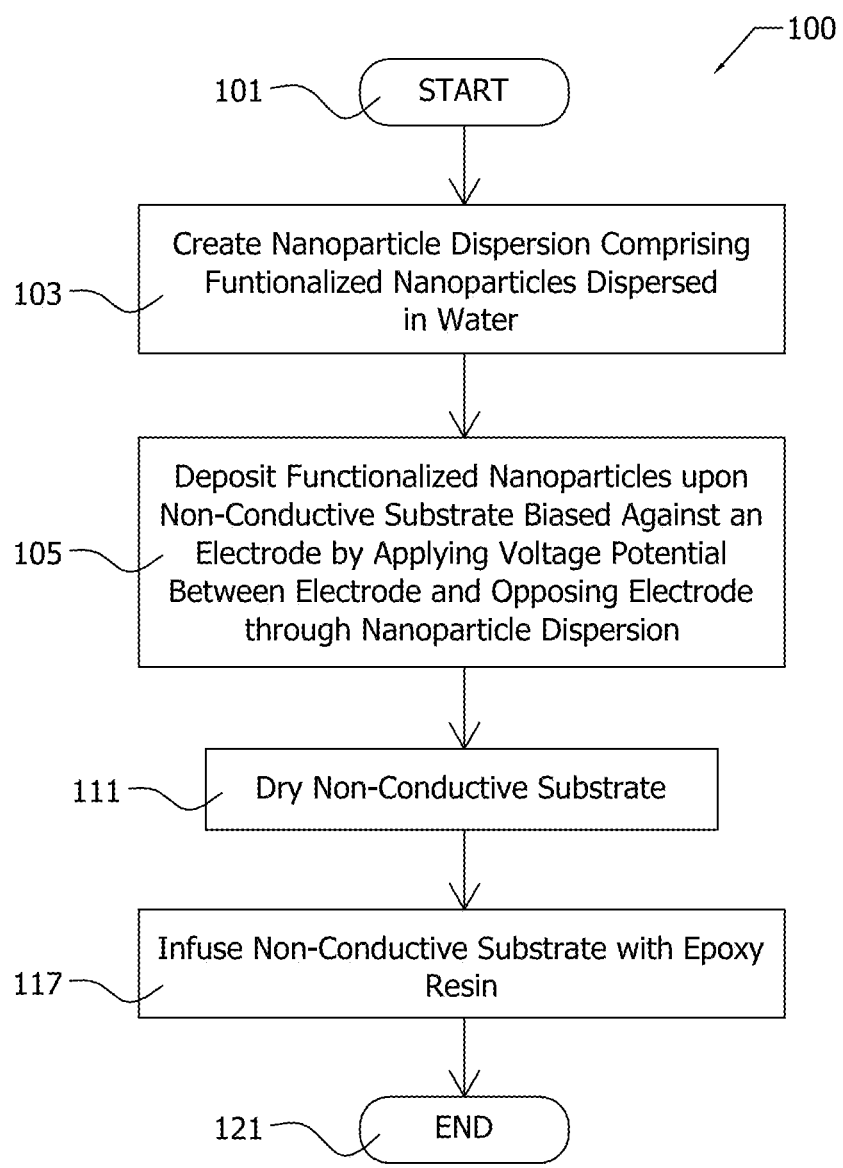
FIG. 1 illustrates by process flow chart an exemplary electrophoretic deposition (EPD) process for the deposition of functionalized nanoparticles upon non-conductive fibers.

The Figures are exemplary only, and the implementations illustrated therein are selected to facilitate explanation. The number, position, relationship, and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

In various aspects, processes for the deposition of nanoparticles upon electrically non-conductive substrates and related apparatus and compositions of matter are disclosed herein. The processes for the deposition of nanoparticles upon electrically non-conductive substrate include the steps of forming a nanoparticle dispersion comprising functionalized nanoparticles dispersed in solvent with the functionalized nanoparticles having a charge, generating an electric field about the non-conductive substrate, and attracting the functionalized nanoparticles to the substrate using the electric field to deposit the functionalized nanoparticles upon the substrate.

The non-conductive substrate may be, for example, a non-conductive fiber, fabric formed of non-conductive fiber(s) including micron-sized non-conductive fibers, fabric, cloth, textile, powder including other discretized materials, in various aspects. The non-conductive substrate may be, for example, a non-woven, woven, knitted, or braided textile assembly of the non-conductive fiber(s). Non-conductive substrate, in various aspects, includes non-conductive fibers and non-conductive fibrous-like structures including their various forms: fiber bundles, fibers and bundles formed in 2-D or 3-D arrangements using textile techniques (such as braiding, weaving, knitting, stitching, etc.), non-woven fabric, and fiber-like structures such as open cell foams. Fibers can be continuous or discontinuous or a combination thereof.

The non-conductive substrate is porous, and a fluid may pass through the non-conductive substrate, in various aspects. The non-conductive substrate, in various aspects, is electrically non-conductive (i.e. an electrical insulator). The non-conductive substrate may be composed of, for example, glass, aromatic polyamide (aramid), or polyethylene terephthalate (polyester), other polymers, or other generally electrically non-conductive materials.

The solvent may be, for example, water, alcohol, or other suitable solvent. The charge of the functionalized nanoparticle may be either positive or negative.

Nanoparticle, as used herein, includes, for example, carbon nanotubes, graphene, expanded graphite nanoparticle (xGnP), graphite, carbon black, copper, silver, other metals, and other materials, as would be readily recognized by those of ordinary skill in the art upon study of this disclosure. A nanoparticle may behave as a unit with respect to transport and with respect to various physical properties. A nanoparticle may be sized, for example, in the range of from about $1\times10^{-9}$ m to about $1\times10^{-7}$ m. The nanoparticles are functionalized, in various aspects.

The functionalized nanoparticles may be formed, for example, by bonding polyethyleneimine (PEI) to oxidized carbon atoms upon surfaces of nanoparticles comprised of carbon, with the oxidized carbon atoms formed by ozonolysis of the nanoparticles. The nanoparticles may be deposited upon the substrate in various patterns, and the patterns may, for example, form electrical circuits for applications such as flexible electronics, solar cells, sensors, strain gauges, or electroluminescent displays. The nanoparticles may be bonded to the substrate by a covalent bond, and the functional group that functionalizes the nanoparticles may be selected to bond to the substrate in order to bond the nanoparticles to the substrate.

The electrophoretic deposition, screen-printing, and inkjet printing processes disclosed herein may be carried out generally at ambient (room) temperature and may be generally energy efficient, in contrast to vapor deposition processes. In various aspects, the temperature at which the electrophoretic deposition, screen-printing, and inkjet printing processes disclosed herein are carried out may range from about 5° C. to about 50° C. The electrophoretic deposition, screen-printing, or inkjet printing processes disclosed herein may be industrially scalable.

Because the electrophoretic deposition, screen printing, and inkjet printing processes may be carried out generally at ambient temperatures, the electrophoretic deposition, screen printing, and inkjet printing processes may not remove sizing(s), if any, adhering to the surface of the electrically non-conductive substrate. For example, when the substrate comprises glass fibers, sizing(s) adhering to the surface of the glass fibers may comprise silanes such as γ-glycidoxypropyltrimethoxy silane (GPS) or other silicon based compounds that adhere to glass. Sizing(s) may comprise various surfactants that, for example, control wetting of the substrate, in various implementations. The sizing(s) may increase the tensile strength of non-conductive fibers that comprise the non-conductive substrate, for example, by preventing stress corrosion cracking of the non-conductive fibers. The sizing(s) may protect non-conductive fibers that comprise the non-conductive substrate from degradation by UV light when the non-conductive fibers comprise, for example, aromatic polyamide, cellulose such as cotton and paper, wool, or polyethylene terephthalate. Sizing may include various dyes. Sizing may include other material(s) and may convey various beneficial properties to the various non-conductive substrates, as would be readily recognized by those of ordinary skill in the art upon study of this disclosure. The sizing(s) may be disposed between the surface of non-conductive fibers forming a non-conductive substrate and functionalized nanoparticles deposited upon the non-conductive fiber to retain, for example, the resistance to stress corrosion cracking of the non-conductive fiber imparted to the non-conductive fiber by the sizing agent, in various aspects.

In various aspects, functionalized nanoparticles in a nanoparticle dispersion are deposited upon the non-conductive substrate. The process of forming the functionalized nanoparticle dispersion may include ozonolysis in alternating combination with high-energy circulative sonication of a solution of nanoparticles to oxidize the nanoparticles and to break up agglomerations of nanoparticles, respectively. Following the steps of ozonolysis in combination with sonication, the process may include the step functionalizing the nanoparticles by attaching functional groups to the surface of the nanoparticles in order to form a functionalized nanoparticle dispersion that is stable. In various aspects, the nanoparticle dispersion is water-based, although other solvents may be used in lieu of water or in combination with water. The addition of functional groups onto the surface of the nanoparticles may be crucial for forming the stable functionalized nanoparticle dispersion by altering the zeta potential of the nanoparticles. The addition of functional groups onto the surface of the nanoparticles may enhance bonding between the nanoparticles and non-conductive fibers to which the nanoparticles are to be bonded, in various aspects. The step of adding functional groups onto the surface of the nanoparticles may include adding a polyelectrolyte to the ozonated and sonicated solution of nanoparticles and then further sonicating the polyelectrolyte—nanoparticle mixture thereby bonding the polyelectrolyte as the functional group to the surface of the nanoparticle.

In various aspects, a variety of additives may be combined with the functionalized nanoparticle dispersion following formation of the functionalized nanoparticle dispersion, for example, to modify the surface tension in order to enable wetting of a surface of the non-conductive substrate by the functionalized nanoparticle dispersion. Various additives may be combined with the functionalized nanoparticle dispersion to alter the viscosity of the functionalized nanoparticle dispersion.

Although the Examples included in this disclosure are generally for carbon nanotubes and graphene nanoplatelets, the techniques for integration may be amenable to a wide range of nanostructures. Similarly, although the Examples herein are generally for glass fiber, the electrophoretic deposition, screen printing, and inkjet printing processes have been successfully applied to aromatic polyamide (aramid), polyethylene terephthalate (polyester), cotton, wool, and to various other non-conductive fibers.

Figure 2:
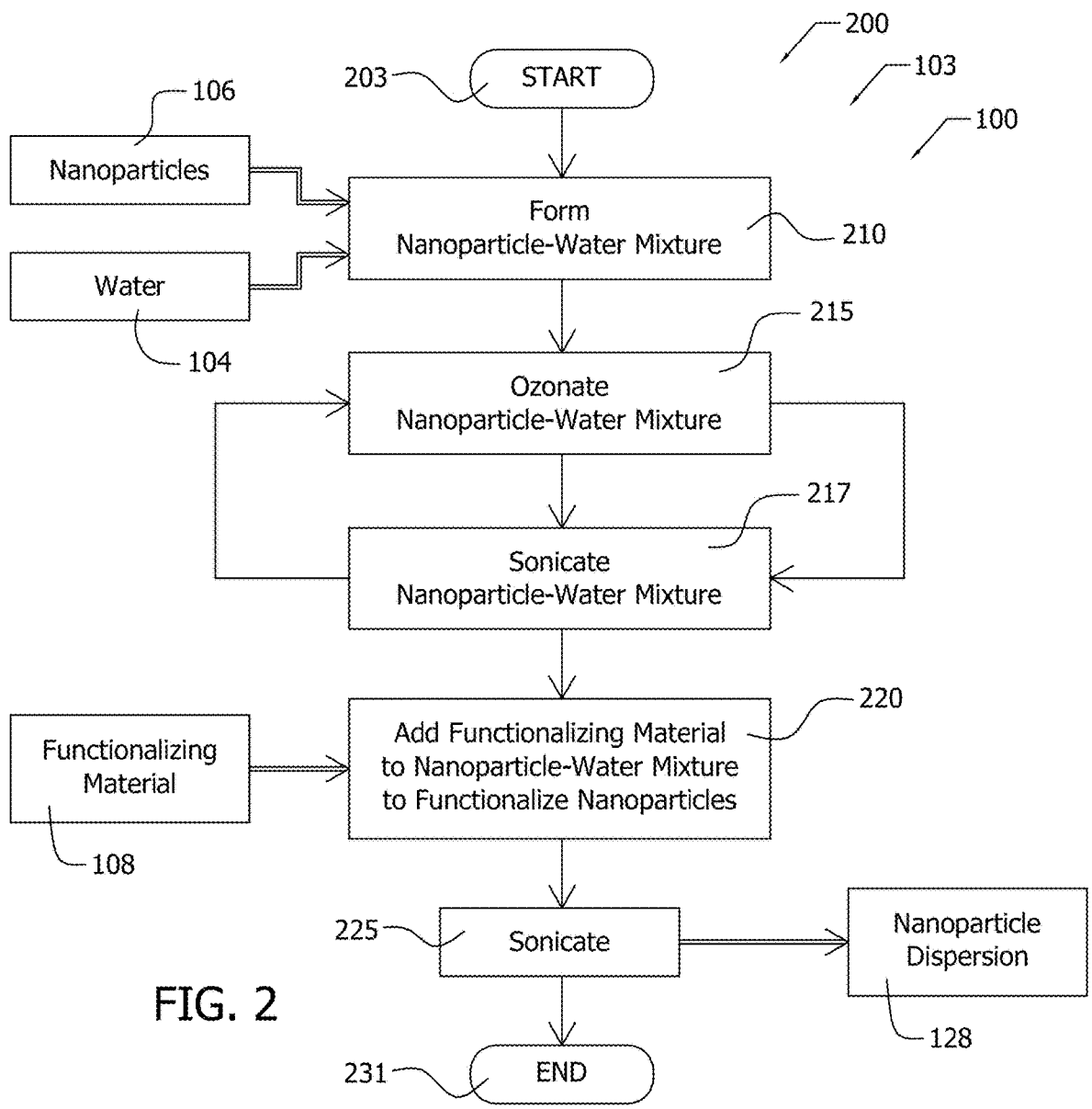
FIG. 2 illustrates by process flow chart an exemplary process for forming an exemplary nanoparticle dispersion for use in the exemplary EPD process of FIG. 1.

FIG. 1 illustrates an exemplary electrophoretic deposition (EPD) process 100 for the deposition of functionalized nanoparticles upon a non-conductive substrate. EPD process 100 is entered at step 101. At step 103, a nanoparticle dispersion, such as nanoparticle dispersion 128, is formed. The nanoparticle dispersion 128 may be formed by process 200, which is illustrated in FIG. 2. The nanoparticle dispersion 128 comprises functionalized nanoparticles dispersed in a solvent such as water.

At step 105, the functionalized nanoparticles are deposited upon a non-conductive substrate. The non-conductive substrate is biased against an electrode, and positioned between the electrode and the opposing electrode. The nanoparticle dispersion is interposed between the electrode and an opposing electrode, and the nanoparticle dispersion is in contact with the non-conductive substrate. A voltage potential is applied between the electrode and the opposing electrode to generate an electrical field about the non-conductive substrate to attract the charged functionalized nanoparticles toward the non-conductive substrate in order to deposit the functionalized nanoparticles upon the non-conductive substrate. The applied field may be constant or time varying. In other implementations, the electrical field may be generated by imparting a static electric charge to the non-conductive substrate, and the nanoparticle dispersion may be introduced to the non-conductive substrate as an aerosol with the functionalized nanoparticles attracted by the static electric charge of the non-conductive substrate. In still other implementations, the nanoparticle dispersion may be dispersed as an aerosol between the electrodes instead of as a liquid.

At step 111, the non-conductive substrate is withdrawn from contact with the nanoparticle dispersion and the non-conductive substrate is allowed to dry.

At step 117, the non-conductive substrate is infused with a polymer when manufacturing a hybrid composite. Exemplary EPD process 100 terminates at step 121.

FIG. 2 illustrates an exemplary process 200 for forming exemplary nanoparticle dispersion 128. Step 103 of EPD process 100, which is illustrated in FIG. 1, may be implemented according to process 200, which is illustrated in FIG. 2. Process flows in FIG. 2 are indicated by arrows and material inputs and material outputs are indicated by the double arrows.

As illustrated in FIG. 2, process 200 is entered at step 203, and process 200 advances from step 203 to step 210. At step 210, nanoparticles 106 are combined with water 104 as solvent to form a nanoparticle-water mixture. Other solvents may be used in other implementations. The water may be ultra-pure, deionized, and so forth. The nanoparticle-water mixture formed at step 210 is then ozonated by the addition of $O_3$ to the water-nanoparticle mixture at step 215. Ozonation may create various oxidized sites on the surface of the nanoparticle to which the functionalizing material 108 may then bond to functionalize the nanoparticle. The functional group, in various implementations, includes the oxidized carbon bonded to the functionalizing material 108.

Figure 3:
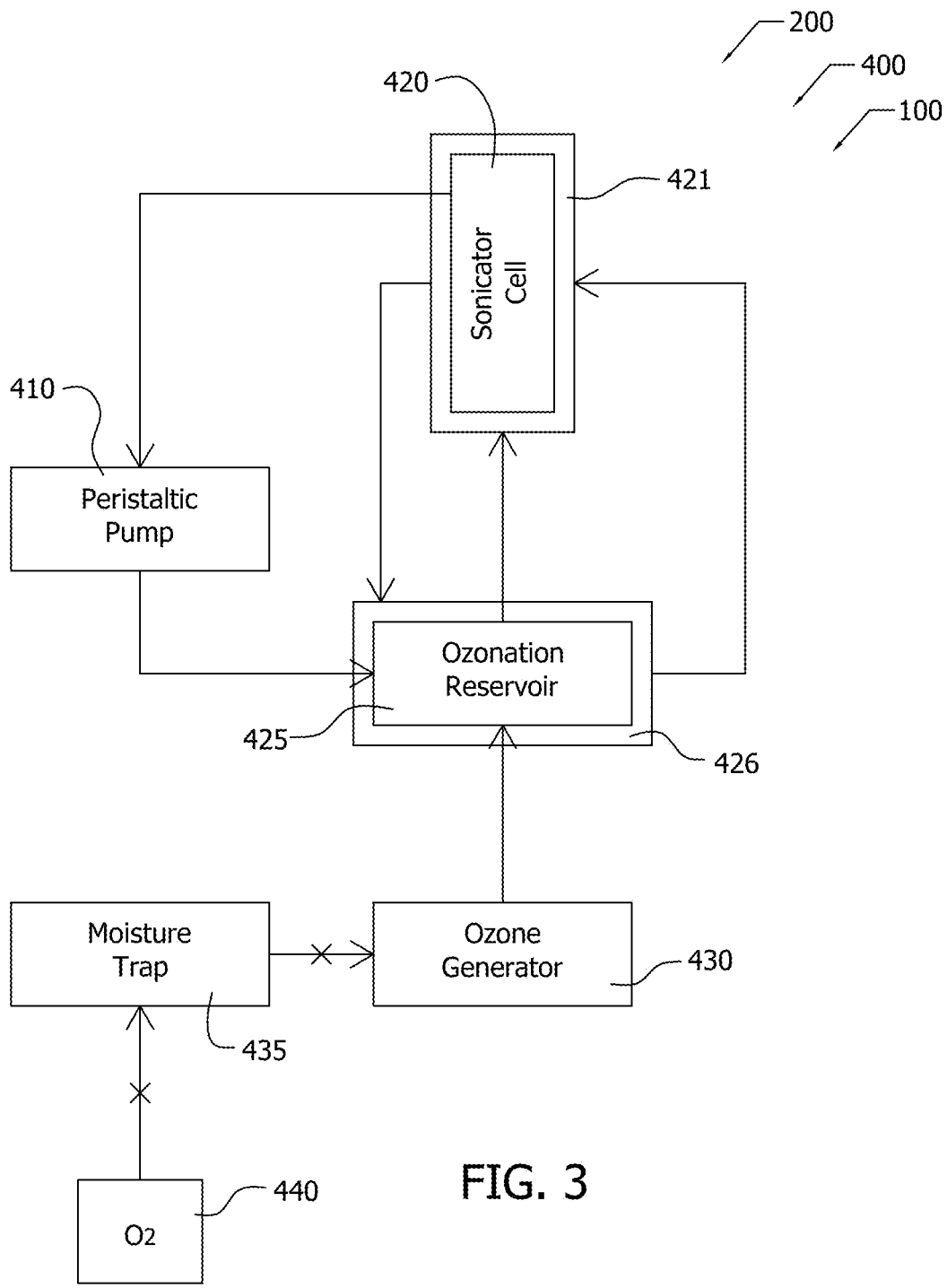
FIG. 3 illustrates by schematic diagram an exemplary apparatus for implementing at least portions of the exemplary process for forming an exemplary nanoparticle dispersion of FIG. 2.

The nanoparticle-water mixture is sonicated at step 217 with the ozonation and the sonication occurring alternately as the nanoparticle-water mixture flows between an ozonation reservoir 425 and a sonicator cell 420 (see FIG. 3). As illustrated in FIG. 2, step 215 and step 217 are repeated in alternation with one another until the ozonation of step 215 in combination with the sonication of step 217 is sufficient to oxidize surfaces of the nanoparticles and to separate the nanoparticles, respectively.

After sufficient ozonation and sonication at steps 215, 217, process 200 then advances from steps 215, 217 to step 220. At step 220, the functionalizing material 108 is added to the nanoparticle-water mixture to functionalize the nanoparticles by bonding to the nanoparticles. The water-nanoparticle mixture with the functionalizing material 108 is then sonicated at step 225 to facilitate functionalizing the nanoparticles by the functionalizing material 108. Following sonication, the functionalized nanoparticle dispersion 128 is output from step 225. Process 200 terminates at step 231.

The functionalizing material 108 may comprise a polyelectrolyte such as polyethyleneimine (PEI). Various molecular weights of PEI may be used, in various implementations. Some implementations may omit functionalizing material 108 and steps 220, 225. In such implementations, the functional groups are the oxidized sites such as oxidized carbon atoms on the surface of the nanoparticles. Nanoparticles comprised of carbon have a negative charge following ozonation at step 215.

Example 1

The nanoparticles, in exemplary Example 1, comprise multi-walled carbon nanotubes (MWCNT) (CM-95, Hanwha Nanotech, Korea) functionalized according to process 200 to produce a functionalized nanoparticle dispersion, such as functionalized nanoparticle dispersion 128 (see FIG. 2). Steps 210, 215, 220, 225 of process 200, in Example 1, were implemented, at least in part, using apparatus 400, which is illustrated in FIG. 3. Exemplary material flows through apparatus 400 are indicated by the arrows in FIG. 3.

As illustrated in FIG. 3, oxygen with a flow rate of 500 mL/min flows from reservoir 440 through moisture trap 435, and, then the oxygen flows from moisture trap 435 to ozone generator 430 (1000BT-12 from Taoture International). Moisture trap 435 removes water (moisture) from the oxygen prior to introduction of the oxygen into ozone generator 430. Ozone generator 430 produces ozone from the oxygen.

Ozone from ozone generator 430 flows from ozone generator 430 into ozonation reservoir 425 where the ozone contacts the MWCNT-water mixture in order to ozonate the MWCNT-water mixer per step 215 of process 200. Ozonation reservoir 425, in this implementation, is maintained at 5° C. by immersion of ozonation reservoir 425 in temperature control bath 426. Ozone concentration reached 20 mg/L after 2 h of operation as determined by iodometric titration.

As illustrated in FIG. 3, the MWCNT-water mixture was sonicated in sonicator cell 420 per step 217 of process 200. Sonication of the MWCNT-water mixture in sonicator cell 420 used a 12.7 mm diameter horn operating at 60 W (Sonicator 3000 from Misonix, USA). Sonicator cell 420, in this implementation, was maintained at 5° C. by immersion in temperature control bath 421. Water is circulated between temperature control bath 421 and temperature control bath 426, in this implementation.

In this exemplary implementation of steps 215, 217 of process 200, the MWCNT-water mixture was ozonated and sonicated for 16 h. A peristaltic pump 410 (Model MU-D01 from Major Science, USA) recirculated the MWCNT-water mixture between ozonation reservoir 425 and sonicator cell 420 (800B Flocell, Qsonica), as illustrated in FIG. 2. Accordingly, steps 215, 217 of process 200 were applied to the MWCNT-water mixture as the MWCNT-water mixture recirculated between ozonation reservoir 425 and sonicator cell 420 in a continuous flow process, so that the MWCNT-water mixture was continuously ozonated and sonicated, respectively.

After 16 hours of sonication, the few agglomerates observed were all submicron in size. Ozonolysis oxidized carbon atoms generally on the surface of the MWCNT, and the oxidized carbons may form, for example, carboxyl groups, hydroxyl groups, or carbonyl groups. Following ozonolysis, the MWCNTs, in this implementation, are functionalized by the oxidized carbons on the surface and have a negative surface charge.

The functionalizing material 108 introduced into the now sonicated and ozonated MWCT-water mixture at step 220 of process 200 as implemented in Example 1 was polyethyleneimine (PEI) (H(NHCH$_2$CH$_2$)$_{58}$NH$_2$; Mw 25,000; Sigma-Aldrich, USA). Other molecular weights of PEI may be used in other implementations. The PEI was at equal concentration to the MWCNT, in this Example. The PEI-MWCNT-water mixture was sonicated for 4 h in the Example 1 implementation of step 225 of process 200 to functionalize the MWCNT by bonding the PEI to the MWCNT in order to form the functionalized nanoparticle dispersion, such as functionalized nanoparticle dispersion 128. The PEI may bond to the oxidized carbons on the surface of the MWCNT, and the PEI may be bonded to the MWCNT by a covalent bond. The pH of the PEI-MWCNT-water was adjusted with glacial-acetic add (Sigma-Aldrich) to a pH around 6 during step 225. The resultant nanoparticle dispersion was then output from apparatus 400.

The functionalization of the MWCNTs enables a surface charge to develop, and the PEI functionalized MWCNTs have a positive surface charge. The surface charge, which may be described in terms of zeta-potential, may be dependent on the solution pH and may repulse adjacent MWCNTs to aid dispersion and mobility under applied electric fields. PEI has a high-natural pH in aqueous solution, but with addition of a mild acid, the amine groups protonate and a +50 mV zeta-potential may be established below a pH of 8, enabling cathodic deposition of the PEI-functionalized MWCNTs. The resultant functionalized nanoparticle dispersion of Example 1 has been stable for at least a year.

Figure 4A:
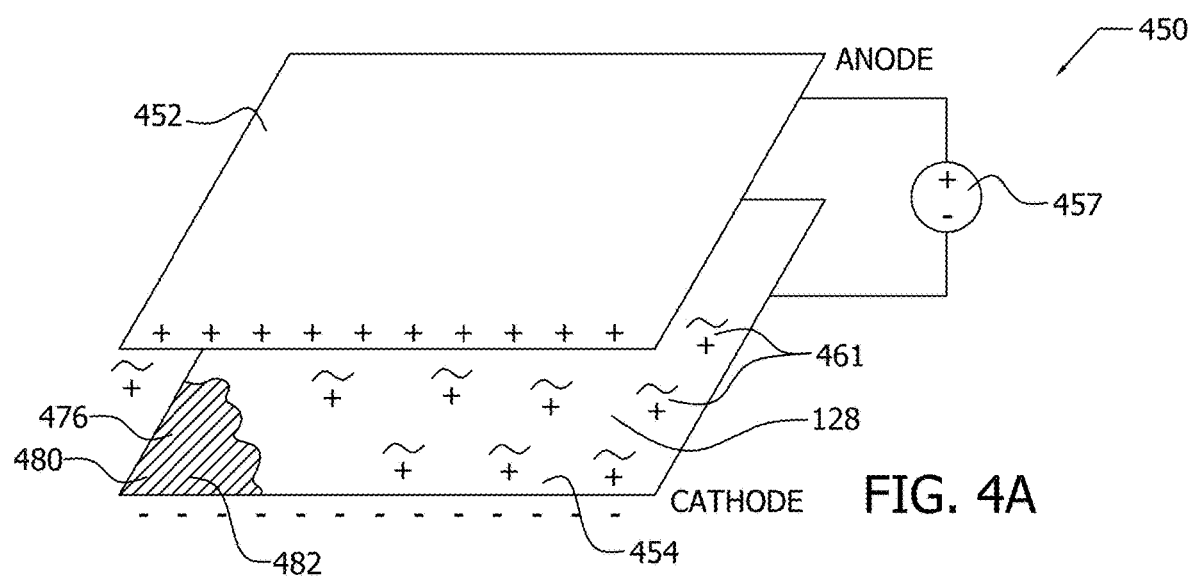
FIG. 4A illustrates by perspective view an exemplary electrophoresis apparatus for performing the exemplary electrophoretic deposition (EPD) process of FIG. 1.

In electrophoretic deposition (EPD), an electric field is induced about a non-conductive substrate. Then, the functionalized nanoparticle, which has a surface charge, is accelerated in the electric field toward the non-conductive substrate for deposition on the non-conductive substrate. As illustrated in FIG. 4A, functionalized nanoparticles 461 may be deposited upon non-conductive substrate 476 that comprises fabric 480 formed of non-conductive fibers 482 by, at least in part, electrophoresis of a functionalized nanoparticle dispersion, such as functionalized nanoparticle dispersion 128. Non-conductive substrate 476, fabric 480, and non-conductive fibers 482 are electrically non-conductive, in this implementation.

In the exemplary implementation of FIG. 4A, electrophoresis apparatus 450 comprises source 457 in communication with electrode 454 having negative charge (cathode) and in communication with an opposing electrode 452 having positive charge (anode). Source 457, in the illustrated implementation, is a constant source that applies a constant voltage potential between opposing electrode 452 and electrode 454.

Nanoparticle dispersion 128 including functionalized nanoparticles 461, as illustrated in FIG. 4A, is disposed between electrode 454 and opposing electrode 452. In the implementation of FIG. 4A, functionalized nanoparticles 461 have a positive surface charge as, for example, the PEI functionalized MWCNTs of Example 1. The functionalized nanoparticles 461 (positive charge), in this implementation, are repelled by the like charged opposing electrode 452 (positive charge), and the functionalized nanoparticles 461 are drawn to the oppositely charged electrode 454 (negative charge) by the electric field induced about non-conductive substrate 476 by electrodes 452, 454.

Non-conductive substrate 476 is biased against electrode 454 between electrode 454 and opposing electrode 452, and non-conductive substrate 476 is in contact with nanoparticle dispersion 128. Non-conductive substrate 476 is illustrated in FIG. 4A as partially covering electrode 454 for explanatory purposes. Electrode 454 induces a positive electric field around non-conductive substrate 476 to attract the functionalized nanoparticles 461 into contact with the non-conductive substrate 476 for deposition upon non-conductive substrate 476. The porous nature of non-conductive substrate 476 may facilitate the induction of the electric field about non-conductive substrate 476 by electrodes 454 by allowing charge to pass through the pores of non-conductive substrate 476. (Note that juxtaposing a non-porous non-conductive substrate between electrodes 452, 454 may form a capacitor.)

The transport of functionalized nanoparticles, such as functionalized nanoparticles 461, toward the electrode 454 and non-conductive substrate 476 may depend upon the mobility of the functionalized nanoparticles 461 that, in turn, may depend upon the size of the functionalized nanoparticles and the magnitude of the surface charge of the functionalized nanoparticles.

The surface charge of the functionalized nanoparticles may be negative in other implementations, for example, MWCNT following ozonolysis. For example, in implementations with negatively charged functionalized nanoparticles, the functionalized nanoparticles are drawn to the positively charged anode 452, and the non-conductive substrate, such as non-conductive substrate 476, is disposed about opposing electrode 454 which then induces a positive electric field about non-conductive substrate 476.

Figure 4B:
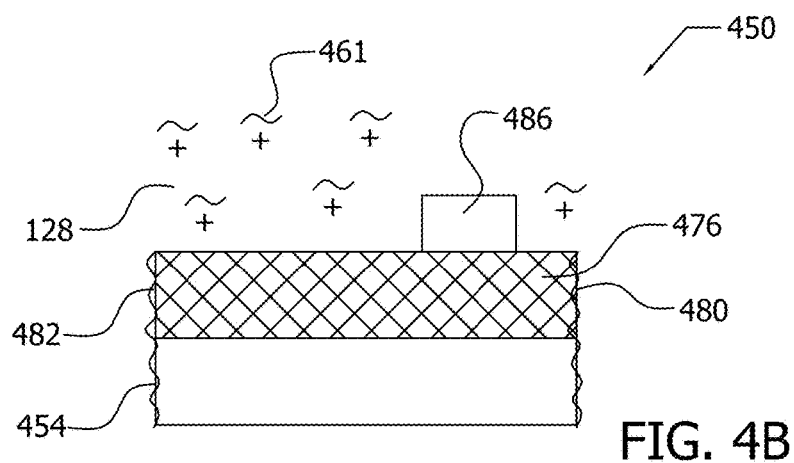
FIG. 4B illustrates by side view portions of the exemplary electrophoresis apparatus of FIG. 4A.

As illustrated in FIG. 4B, mask 486 overlays portions of the non-conductive substrate 476 in biased engagement with non-conductive substrate 476 during deposition to shield the portions of non-conductive substrate 476 engaged with mask 486 from deposition of functionalized nanoparticles 461. The mask 486 physically blocks the deposition of functionalized nanoparticles 461 onto those portions of non-conductive substrate 476 overlain by mask 486.

Figure 4C:
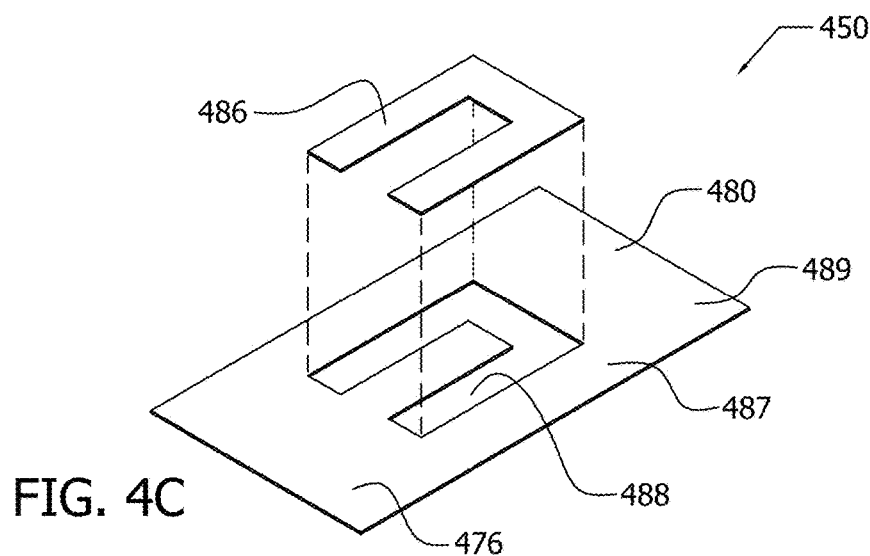
FIG. 4C illustrates by perspective exploded view portions of the exemplary electrophoresis apparatus of FIG. 4A.

Mask 486 may be variously shaped, for example, as illustrated in FIG. 4C, to create a patterned deposited morphology of the functionalized nanoparticles 461 upon non-conductive substrate 476. Mask 486 may define a non-deposited region 488 on non-conductive substrate 476 that conforms to the shape of the mask 486 within which the functionalized nanoparticles 461 are not deposited upon non-conductive substrate 476. Deposited region 487 on non-conductive substrate 476 is that portion of non-conductive substrate 476 that is not covered by the mask 486 within which the functionalized nanoparticles 461 are deposited on the non-conductive substrate 476, as illustrated in FIG. 4C. Deposited region 487, as illustrated, has pattern 489 that may, for example, define electrically conductive pathway(s) on non-conductive substrate 476. Mask 486 may be either conductive or non-conductive, in various implementations. If mask 486 is formed of a non-conductive material, mask 486 decreases the electric field proximate those portions of non-conductive substrate 476 overlain by mask 486 during EPD.

Figure 4D:
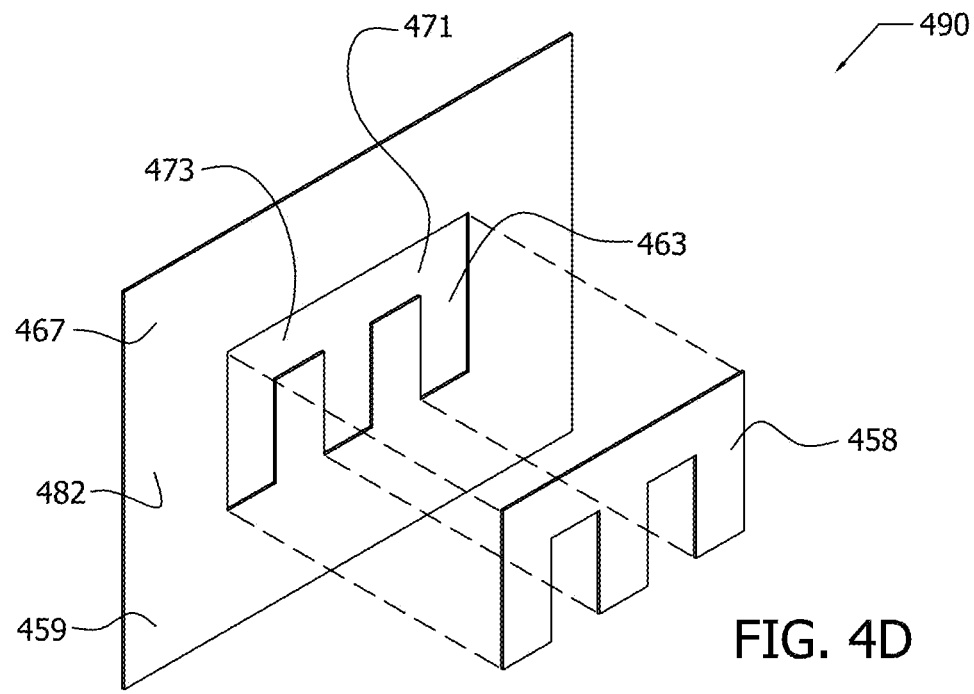
FIG. 4D illustrates by perspective exploded view portions of another exemplary implementation of an electrophoresis apparatus.

As illustrated in FIG. 4D, electrode 458 of electrophoresis apparatus 490 is shaped to create a patterned deposited morphology of the functionalized nanoparticles 461 upon non-conductive substrate 467 having pattern 471. Because intimate contact between electrode 458 and non-conductive substrate 467 may be required for deposition of functionalized nanoparticles 461 upon non-conductive substrate 467, the functionalized nanoparticles 461 may be deposited in a pattern 463 upon non-conductive substrate 467 by correspondingly patterning electrode 458 that biases against non-conductive substrate 467 during the EPD process. Note that, in this FIG. 4D implementation, non-conductive substrate 467 is formed of non-conductive fibers, such as non-conductive fibers 482.

As illustrated in FIG. 4D, functionalized nanoparticles, such as functionalized nanoparticles 461, are deposited upon non-conductive substrate 467 by EPD in a deposited region 463 having pattern 471 corresponding to the shape of electrode 458. The deposited region 463 may, for example, define pattern 471 of electrically conductive pathways 473 upon non-conductive substrate 467 with a desired configuration. Non-deposited regions 459 where functionalized nanoparticles are not deposited may be formed on portions of non-conductive substrate 467 not in biased engagement with electrode 458, as illustrated in FIG. 4D.

Various combinations of masks, such as mask 486, and electrodes, such as electrode 454, 458, may be combined with one another to create various patterns and combinations of patterns, such as patterns 471, 489, of deposited functionalized nanoparticles upon non-conductive substrate, such as non-conductive substrate 476, 467. The patterns of functionalized nanoparticles so formed may be hierarchically structured, in various implementations. The nanoscale conductive network can be utilized, itself, as a sensor where the piezoresistive properties of the network can be exploited to sense deformation, temperature and other external stimuli. The hybridization enables the future integration of adaptive, sensory, active, or energy storage capabilities of nanostructures within non-conductive substrate such as textile materials. Other applications may include EMI shielding and heating of the non-conductive substrate through resistive energy dissipation.

Process parameters that may affect the EPD process may include concentration of functionalized nanoparticles in the nanoparticle dispersion, surface charge of the functionalized nanoparticles, spacing between the electrodes, applied field strength, and deposition time. While electro-kinetic factors lead to the deposition of functionalized nanoparticles on non-conductive fibers and film formation on the non-conductive fibers, Brownian diffusion randomizes the particle distribution in solution. Brownian diffusion redistributes the functionalized nanoparticles into inter-fiber regions at longer deposition times.

A constant source, such as source 457, may cause electrolysis of water and the formation of hydrogen and oxygen bubbles that result in micro-scale porosity and spalling of the deposited functionalized nanoparticles. Furthermore, functionalized nanoparticles may precipitate from solution when a constant source is used due to the high pH gradients that develop near the electrode, such as electrode 454, and cause solution instability.

Figure 4E:
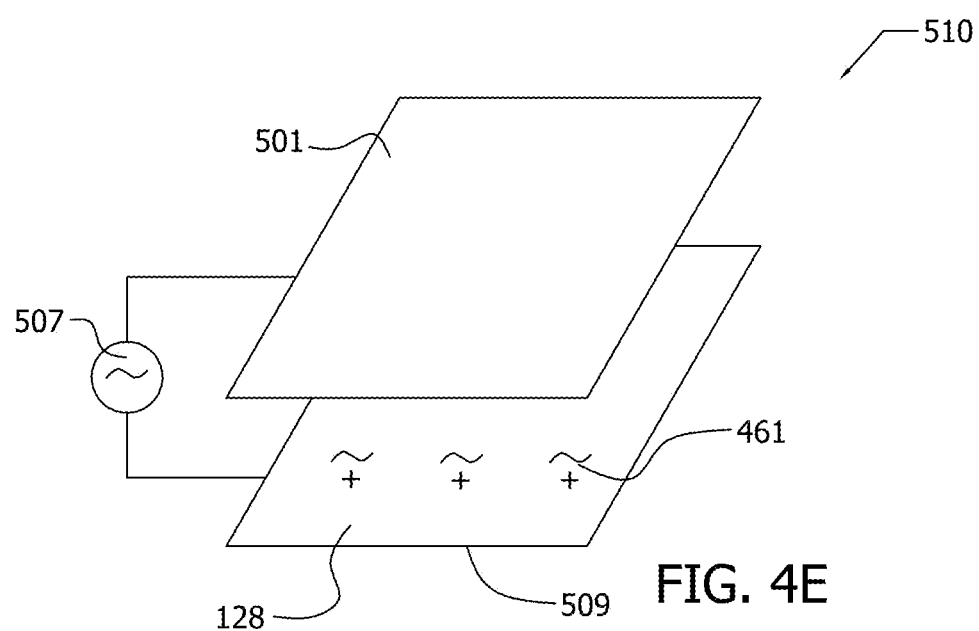
FIG. 4E illustrates by perspective view yet another exemplary implementation of an electrophoresis apparatus.

Accordingly, in electrophoresis apparatus 510, voltage source 507 is configured as a time varying source, as illustrated in FIG. 4E. In the exemplary implementation of FIG. 4E, electrophoresis apparatus 510 comprises source 507 in communication with electrodes 501, 509. As illustrated, nanoparticle dispersion 128 with functionalized nanoparticles 461 lies between electrodes 501, 509.

In the implementation of FIG. 4E, voltage source 507 is configured to generate a waveform having a net zero integral. For example, the exemplary waveform generated by source 507 is that of a simple triangular asymmetric wave where the integral over a single period is zero as illustrated in FIG. 4F. Other waveforms having a net zero integral may be used in other implementations. The net zero integral suppresses the electrolysis of water, thereby eliminating the spalling and micro-porosity that may occur with a DC source. Furthermore, the suppression of electrolysis may reduce or eliminate the pH gradient and may enable deeper and more efficient penetration of the functionalized nanoparticles into fiber bundles of fibers, such as fibers 482. In addition, the alternating mobility of the functionalized nanoparticles may further enhance penetration of the functionalized nanoparticles into fiber bundles.

At high electric fields the velocity of the functionalized nanoparticle 461 being deposited is a non-linear function of the electric field expressed by:

$$V_{eph} = \mu_1 E + \mu_2 E^3 \qquad (1)$$

where $V_{eph}$ is the velocity of the functionalized nanoparticle 461, E is the voltage potential, and $\mu_1$ and $\mu_2$ are the linear electrophoretic mobility and non-linear electrophoretic mobility, respectively. Because of the non-linearity of Eq. 1, the functionalized nanoparticle 461 moves a greater distance during the high amplitude segment of the waveform of FIG. 4F than during the low amplitude segment of the waveform of FIG. 4F. Accordingly, the positively charged functionalized nanoparticle 461 will be drawn to the one of electrodes 501, 509 that is negatively charged during the high amplitude segment of the wave form of FIG. 4F in preference to the other of electrodes 501, 509 that is negatively charged during the low amplitude segment of the waveform of FIG. 4F. Other waveforms having a net zero or net non-zero integral may be used in other implementations.

Example 2

Functionalized nanoparticles in various nanoparticle dispersions were deposited by EPD process under differing conditions upon a non-conductive fabric formed of E glass fibers (non-conductive) and upon a conductive fabric formed of carbon fibers (conductive) in Example 2 for purposes of comparison. The functionalized nanoparticles were MWCNT functionalized with PEI as in Example 1.

Sizing, such as GPS, if any, were not removed from the glass fiber during deposition of functionalized nanoparticles upon the glass fiber by the EPD process. The EPD process, in this Example, was carried out generally at ambient (room) temperature. Because EPD is carried out generally at ambient temperature, the EPD process does not remove sizing, if any, from the surface of other non-conductive fibers, in other implementations.

Figure 5A:
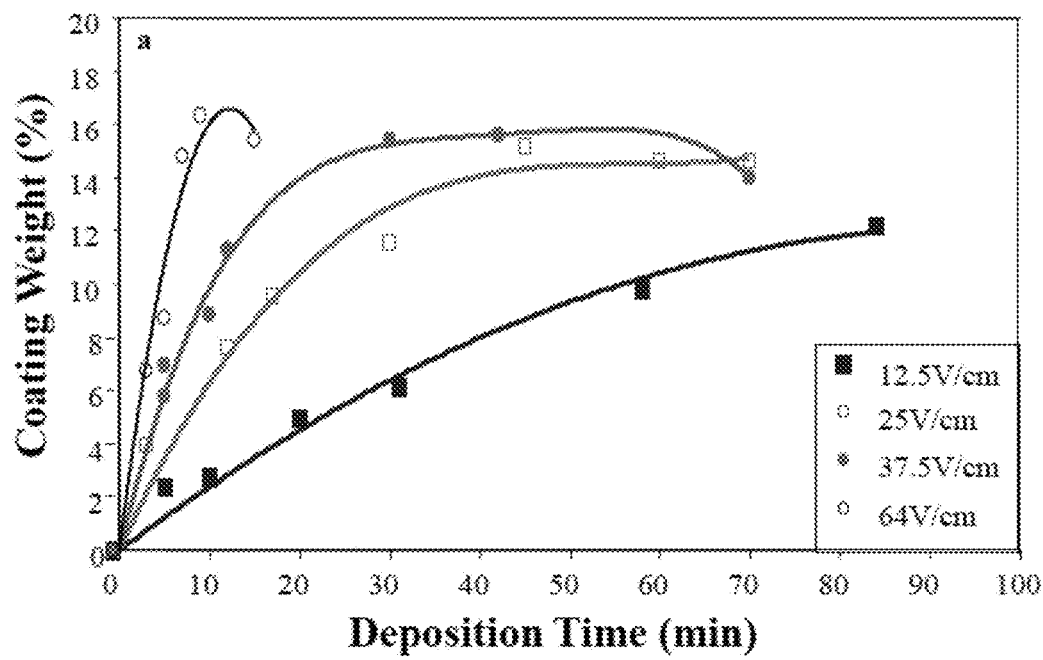
FIG. 5A illustrates by Cartesian plot exemplary results of exemplary Example 2.
Figure 5B:
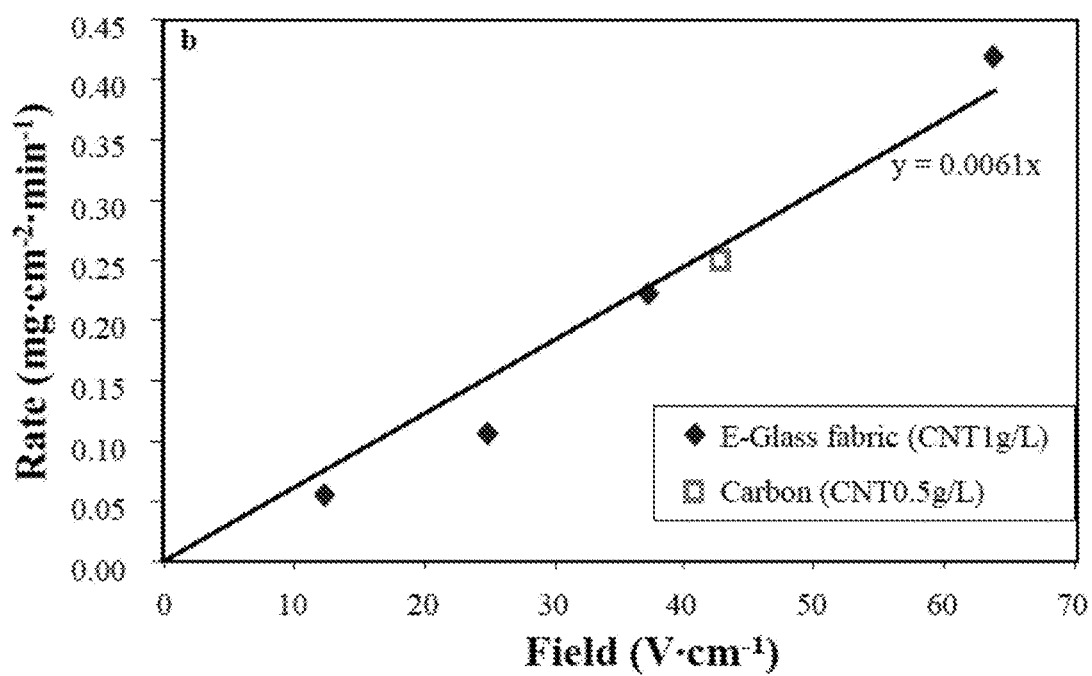
FIG. 5B illustrates by Cartesian plot more exemplary results of exemplary Example 2.
Figures 6A, 6B, 6C, 6D:
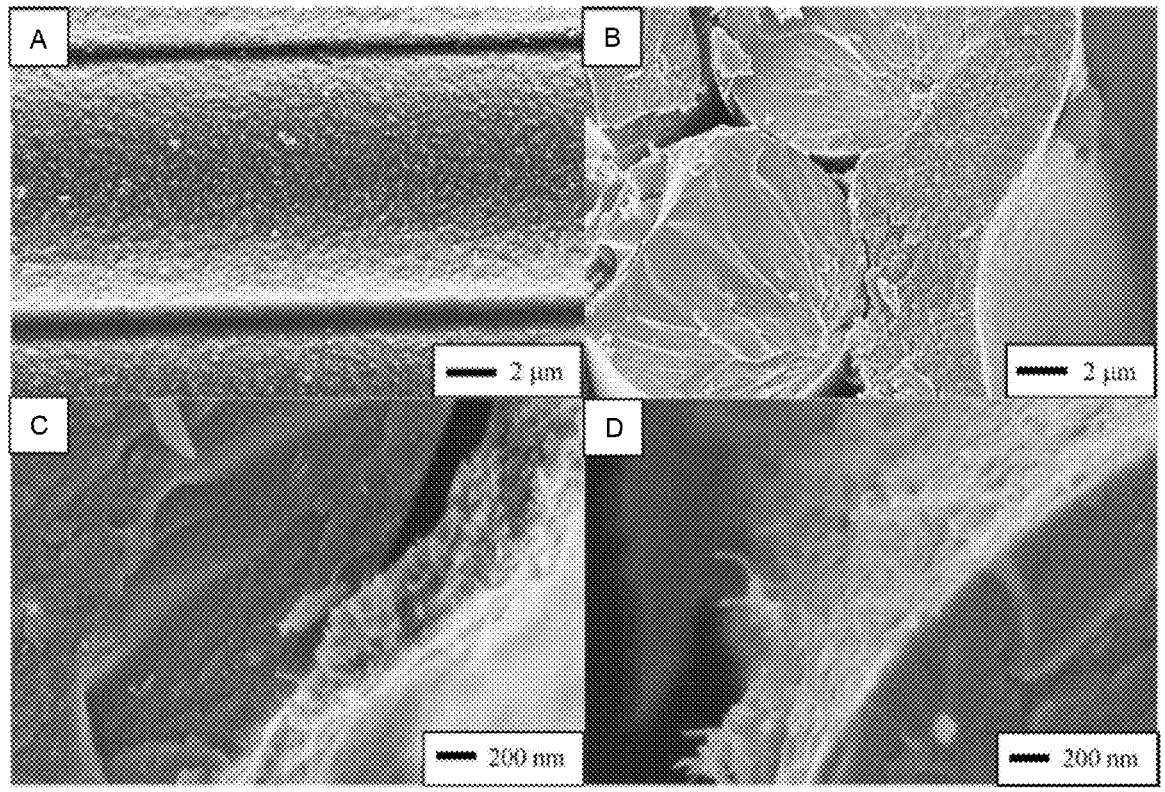
FIG. 6A constitutes an SEM image of glass fiber coated with functionalized MWCNTs fabricated in exemplary Example 2.
FIG. 6B constitutes another SEM image of glass fiber coated with functionalized MWCNTs fabricated in exemplary Example 2.
FIG. 6C constitutes another SEM image of glass fiber coated with functionalized MWCNTs fabricated in exemplary Example 2.
FIG. 6D constitutes yet another SEM image of glass fiber coated with functionalized MWCNTs fabricated in exemplary Example 2.

The glass fiber deposition mass for the nanoparticle dispersion at field strengths between 12.5 and 64 V/cm is shown in the FIG. 5A. In the initial linear deposition stage, it was possible to estimate the deposition rate as a function of field strength, which is shown in FIG. 5B. The deposition rate for glass fibers is compared to that measured for carbon fibers in FIG. 5B. As can be seen from FIG. 5B, the deposition rate upon glass fibers at the same field strength is about the same as the deposition rate upon carbon fibers where the concentration of the nanoparticle dispersion for carbon fibers was only half the concentration of the nanoparticle dispersion for glass fibers. On the basis of the linear dependence of deposition rate with dispersion concentration, the deposition rate on glass is around half that observed on carbon fibers. The reduced rate may be expected as the film deposition process on glass fiber (non-conductive) would differ when compared to the film deposition process on carbon fiber (conductive).

FIGS. 6A-6D shows MWCNTs deposited on the E-glass fiber from the nanoparticle dispersion at 25 V/cm for 15 min. The film appears to be compact with the MWCNTs embedded in the PEI polymer. The outer surface of the fabric (FIG. 6A, 6B) shows a uniform film around 2 μm thick. Deeper into the fabric tow (FIG. 6C, 6D) the film appears as uniform and between 50 and 200 nm. Process parameters may be optimized to control the thickness.

The following mechanism of MWCNT deposition upon the fabric is hypothesized. The MWCNTs precipitate out of solution onto the electrode and onto the surface of the fabric that is biased against the electrode. The portions of the fabric onto which the MWCNTs are deposited then become incorporated into the electrode. This initiation of precipitation of the MWCNTs at the electrode and fabric in biased contact with the electrode may explain why intimate contact is required between non-conductive substrates and the electrode. As portions of the fabric become incorporated into the electrode, the precipitation of the MWCNTs occurs at the boundary between the portion of the fabric incorporated into the electrode and remaining portions of the fabric. Accordingly, precipitation of the MWCNTS progresses from the surface of the fabric that is biased against the electrode outwardly into pores in the fabric to form the film upon fibers within the pores. As the MWCNTs build up upon the fibers, the MWCNTs, which are conductive, may bridge between fibers within the pores to extend the electrode into the fabric. The build-up of MWCNTs in the pores continues progressively from the surface of the fabric biased against the electrode outwardly through the fabric until the build-up of MWCNTs reaches the opposite surface of the fabric. When the build-up of MWCNTs reaches the opposite surface of the fabric, the fabric is incorporated into the electrode, and MWCNTs are deposited upon the opposite surface of the electrode by attraction to the opposite surface and precipitation upon the opposite surface. Accordingly, the deposition of MWCNTs upon the opposite surface and throughout the fabric may occur by precipitation, not by sedimentation.

Continuing the hypothetical discussion of deposition of MWCNTs, the precipitation of the PEI functionalized MWCNTs or other functionalized nanoparticles may occur by de protonation of, for example, the PEI functional group at the electrode. Electrolysis of the water may enhance de protonation and, thus, the precipitation of the MWCNTs. Accordingly, regulation of electrolysis may control the precipitation of the MWCNTs. The porosity of the combination substrate-MWCNTs may be controlled by controlling the precipitation of MWCNTs along with selecting the size of the nanoparticles (MWCNTs). It may be advantageous to use a time varying source with a non-zero integral (bias), in some implementations, to regulate electrolysis in order to control precipitation. This concludes this particular hypothetical discussion.

It was also noted during the experiments that the MWCNTs became strongly attached to the conductive electrode. Abrasion using sandpaper was required to remove the MWCNTs from the electrode, which was made of stainless steel.

Figures 7A, 7B, 7C, 7D:
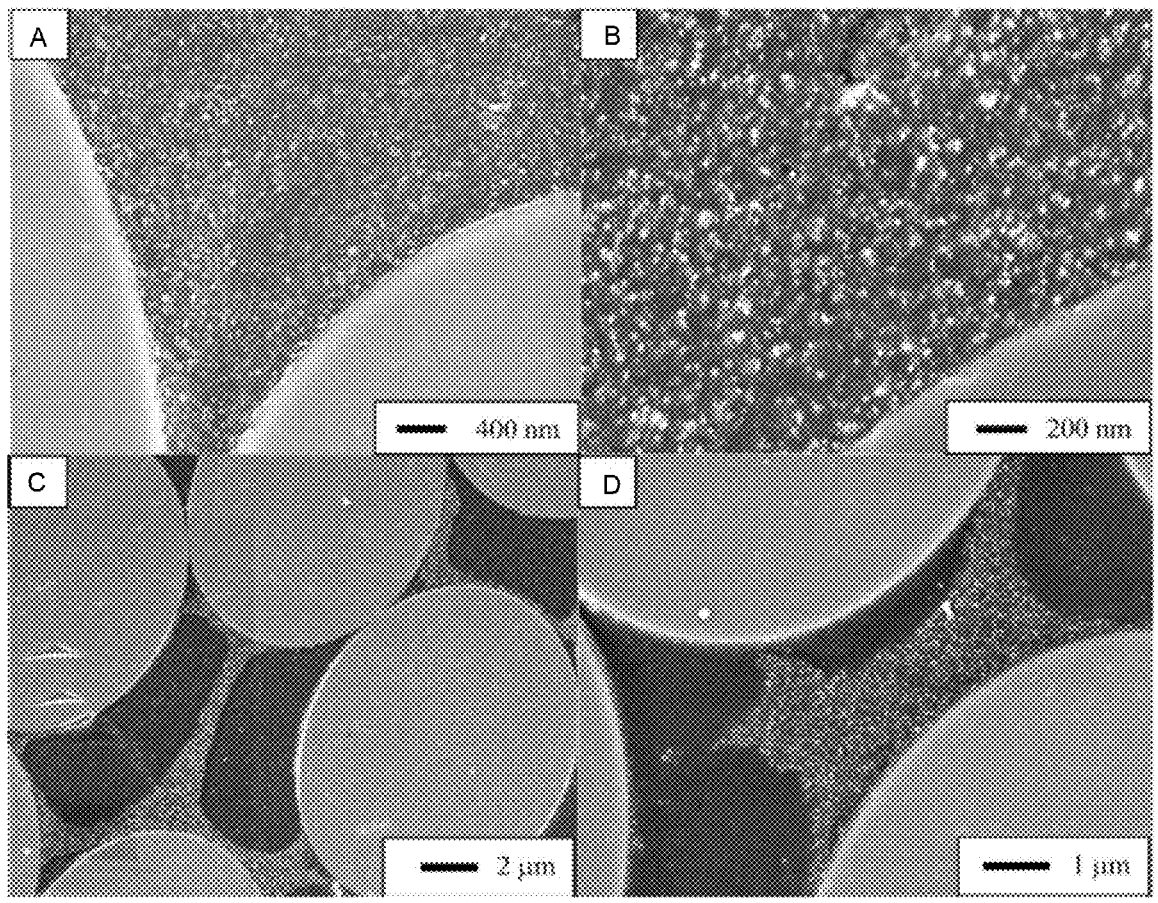
FIG. 7A constitutes an SEM image of cross-sections of glass fibers coated with functionalized MWCNTs and then infused with resin as fabricated in exemplary Example 2.
FIG. 7B constitutes another SEM image of cross-sections of glass fibers coated with functionalized MWCNTs and then infused with resin as fabricated in exemplary Example 2.
FIG. 7C constitutes another SEM image of cross-sections of glass fibers coated with functionalized MWCNTs and then infused with resin as fabricated in exemplary Example 2.
FIG. 7D constitutes another SEM image of cross-sections of glass fibers coated with functionalized MWCNTs and then infused with resin as fabricated in exemplary Example 2.

Polished cross-sections of the polymer-infused glass-fibers with MWCNTs deposited were also examined to determine porosity and MWCNT distribution throughout the laminate, as shown in FIGS. 7A-7D. The film that builds up on the outer fibers appears to be well infused (FIG. 7A) and there are few voids, even when observed at high magnification (FIG. 7B), indicating the resin diffuses through the coating and produces a good-quality, low-void laminate. Further into the interior of the fabric, the coating thickness decreases and a thin MWCNT coating is observed around individual fibers together with a network that spans between adjacent fibers (FIGS. 7C, 7D). The Figures show examples of microscale porosity (FIG. 8A) and spalling (FIG. 8B) of the deposited MWCNTs. The microscale porosity and spalling may be the result of the use of a constant voltage source and attendant electrolysis of water.

Figure 11:
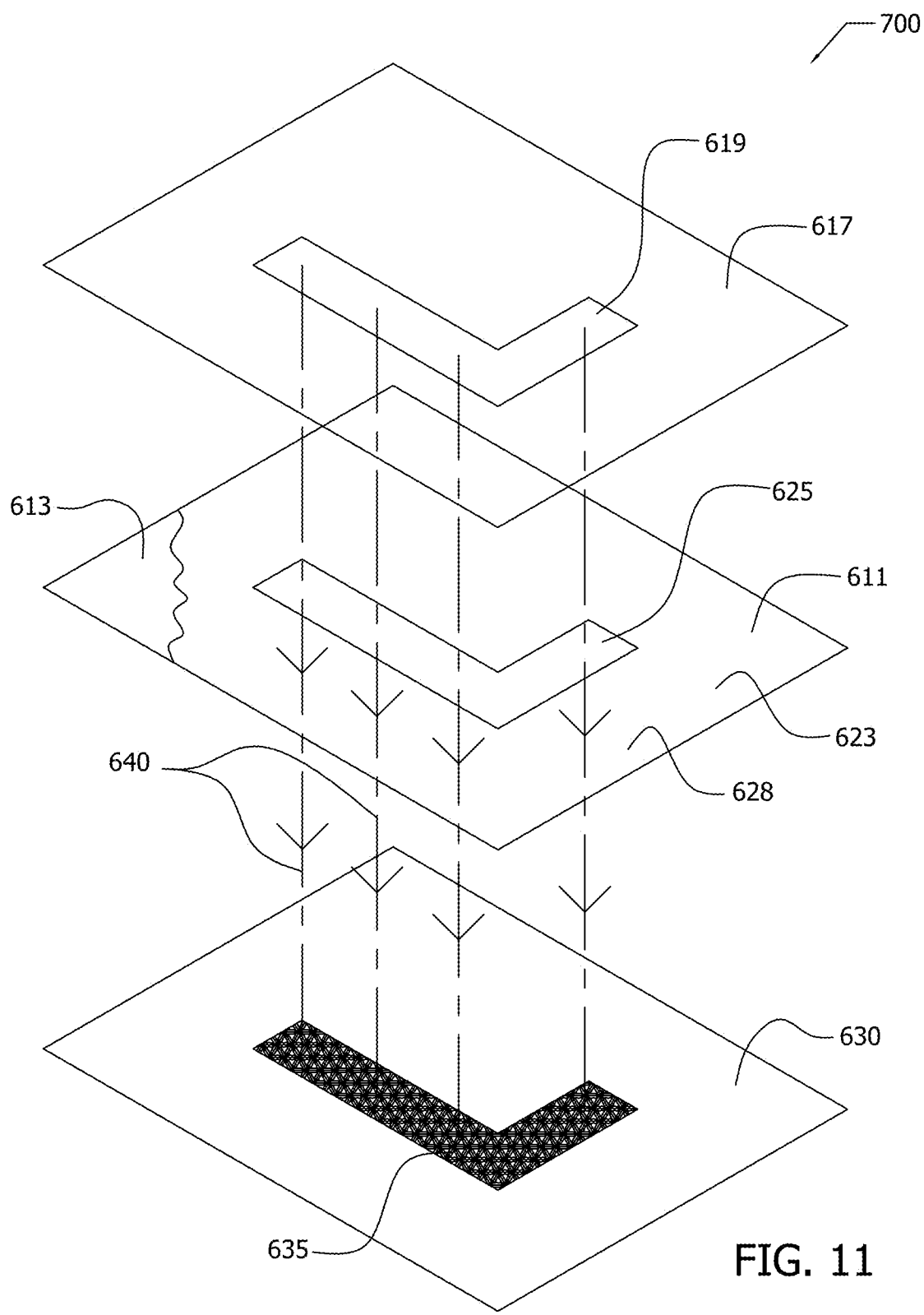
FIG. 11 illustrates by exploded perspective view various exemplary apparatus employed in conducting exemplary screen printing process of FIG. 12A.

Functionalized nanoparticles may be deposited in various patterns onto fabrics formed of non-conductive fibers by a screen-printing process, such exemplary screen-printing process 700 (see FIG. 12A), using screen ink, such as screen ink 640 (see Example 3 and FIG. 11). The screen ink may also serve as a sizing for the non-conductive substrate. Sizing on the non-conductive fibers of the non-conductive substrate are not removed by the screen-printing process, in various implementations. Additional processing constraints that may be inherent to the screen-printing may require modification of surface tension and viscosity of the nanoparticle dispersion to obtain an ink with desirable rheological properties.

Figure 12A:
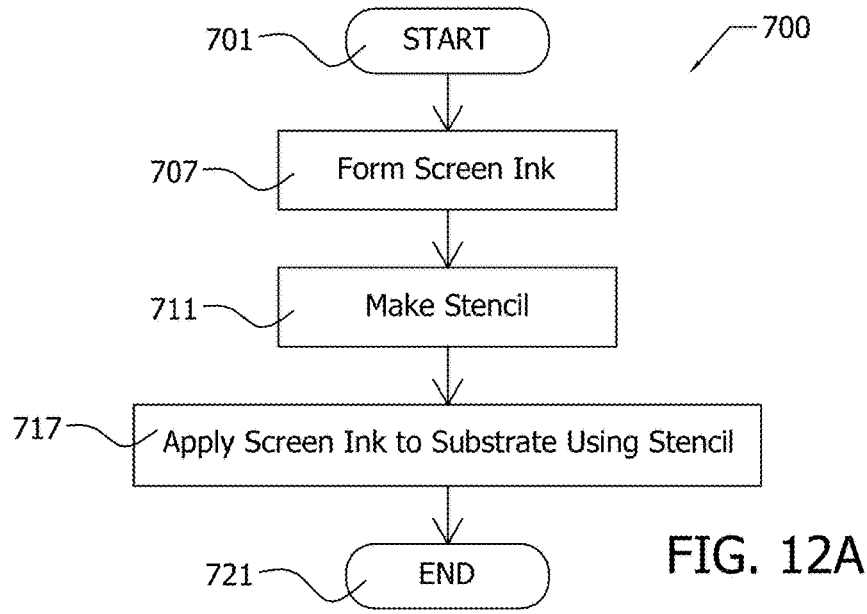
FIG. 12A illustrates by process flow chart an exemplary screen printing process.

As illustrated in FIG. 12A, screen-printing process 700 is initiated at step 701. At step 707, the screen ink is formed. At step 711, the stencil is made. Then, at step 717, the screen ink is applied to the non-conductive substrate using the stencil in ways as would be readily recognized by those of ordinary skill in the art upon study of this disclosure. The non-conductive substrate may have a static electric charge to attract the functionalized nanoparticles. Process 700 terminates at step 721.

Example 3

Screen ink 640, in this Example, was formed by, first, adding a coalescing agent (PVP K-90, Ashland Inc.) to ultra-pure water to form a mixture. Then, a polymeric ink binder (Polyox WSR N-60k, Dow) was added to the mixture. The coalescing agent ensures an even dispersion of the polymeric ink binder, which promotes adhesion of the deposition to the glass fibers of a glass fiber fabric. Non-conductive substrate 630 to which the screen ink 640 was applied, in this Example, was a fabric formed of unidirectional E-glass fibers that are electrically non-conductive, so that the substrate was electrically non-conductive. The binder is required to increase the screen ink's surface energy, because the surface energy of the ultrapure water (72 dynes/$cm^2$) exceeds the surface energy of the glass fibers (46 dynes/$cm^2$) causing poor wetting of the glass fibers. The viscosity of the mixture may then be adjusted with hydroxyethyl cellulose water-soluble polymer (Cellosize QP 52000, Dow) to thicken and impart a thixotropic behavior to the mixture. A thixotropic fluid is a form of pseudoplasticity where the apparent viscosity of the thixotropic fluid decreases over time or 'thins out' during application of a constant shear rate to the thixotropic fluid. Shear thinning may be an essential property for printing clear patterns with consistent thicknesses and substrate penetration. All aforementioned rheological additives—coalescing agent, polymeric ink binder, hydroxyethyl cellulose water-soluble polymer—are added to the mixture at 1 weight % of the ultra-pure water in the order of presentation to form the precursor solution.

Nanoparticles are then added to the precursor solution to form the screen ink. The nanoparticles comprise chemical vapor deposition-grown multi-walled carbon nanotubes (MWCNT) from Hanwha Nanotech (CM-95, >95% graphitic carbon, Korea) and exfoliated graphite nanoplatelets (xGnP). The nanoparticles are processed to reduce the agglomerated nanomaterials to the desired morphology. First, the MWCNT are added to the precursor solution and the precursor solution containing the MWCNT is then processed by calendering. Calendering untangles the several micron-long MWCNT that is agglomerated into intertwined bundles while maintaining the desirable aspect ratio, thus enabling electrical percolation at lower concentrations. There exists a non-linear relationship between the extent of carbon nanotube processing and electrical resistivity where smaller gap settings in the calendering mill create local maximum and minimum resistivity values indicating a transition from agglomerated particulate versus disentangled carbon nanotube dispersion.

Second, after calendering the MWCNTs, the as-received powdered xGnP nanomaterial is added to the precursor solution and then processed by a shear mixing approach using a three-roll calendering mill. The larger size of the xGnP in comparison to the MWCNT requires processing in the calendering mill at larger gap settings than the WMCNT to achieve an electrically conductive solution but requires less processing than carbon nanotubes, which require processing at finer gap settings. Shearing of the xGnP turbostatic carbon planes into the idealized few layer graphene increases the effectiveness of its nanocomposites.

The precursor solution with the added MWCNT and xGnP nanoparticles and following the calendering of both the MWCNT and xGnP nanoparticles constitutes the screen ink 640 (see FIG. 11). The MWCNT and xGnP nanoparticles, for example, provide the necessary electrical conductivity to form sensor networks in the non-conductive substrate for damage sensing or strain sensing.

Example 4

Screen ink 640 formed according to Example 3 including the MWCNT and xGnP nanoparticles dispersed therein was deposited onto unidirectional E-glass substrate 630 in the desired pattern through use of an adapted screen printing process, as per step 717 of process 700.

Figure 12B:
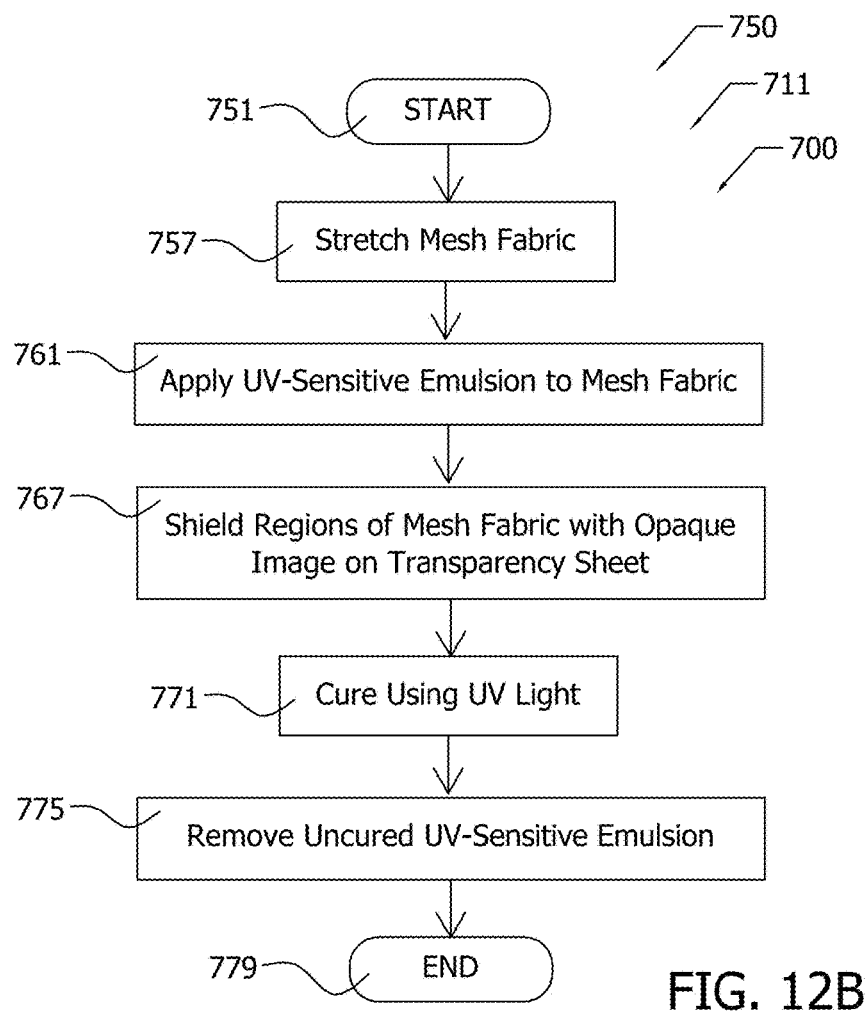
FIG. 12B illustrates by process flow chart details of an exemplary step of the exemplary screen printing process of FIG. 12A.

The stencil was made, per step 711 of process 700, according to process 750 illustrated in FIG. 12B. Process 750 is initiated at step 751, and mesh fabric 611 is stretched at step 757. In this implementation of process 750, a 120-count mesh fabric 611 was stretched by application of a force of 18 N to 22 N, as illustrated in FIG. 11. The mesh fabric 611, per step 761 of process 750, was coated with a UV-sensitive emulsion 613 (illustrated in FIG. 11 as partially covering mesh fabric 611 for explanatory purposes). Then, per step 767 of process 750, a transparency sheet 617 with a high opacity image 619 was used to shield regions of the mesh fabric 611 to prevent cure of the shielded regions thereby forming uncured regions 625 that conform to the high opacity image 619 (also see FIG. 11). Other regions of the mesh fabric 611 were left exposed to allow curing of the exposed regions thereby forming cured regions 623, as illustrated in FIG. 11. A UV light was applied to the mesh fabric causing curing of the exposed regions to form the cured regions 623 while the shielded regions remained uncured to form uncured regions 625, per step 771 of process 750. The uncured regions 625 conform to nanoparticle pathways 635 to be formed in the substrate 630, as illustrated in FIG. 11.

Following curing by application of the UV light, the mesh fabric 611 was rinsed with water to expose the mesh of the uncured regions 625 and to remove uncured UV sensitive emulsion 613, as per step 775 of process 750. The mesh of the mesh fabric 611 was blocked by the cured UV-sensitive emulsion 613 in cured regions 623. The mesh fabric 611 with uncured regions 625 having exposed mesh and cured regions 623 having a blocked mesh forms stencil 628.

In applying the screen ink 640 to substrate 630 as per step 717 of process 700, the stencil 628 was set above the substrate 630 in the 0° fiber direction. The screen ink 640 is then directed through the mesh of the un-cured regions 625 by hand using a blade at a consistent speed and pressure by in both forward and backwards directions twice to ensure a high-quality print. After screen printing according to process 700, the substrate 630 was heated at 60° C. for four hours in a vented convention oven to expel the aqueous base of the screen ink leaving the nanoparticle adhered to the substrate 640. The nanoparticles form pathways 635 upon the substrate 630 in conformance to the uncured regions 625 with exposed mesh of the stencil 628. The substrate 630 may then be infused with resin. Silver paint may be applied to the pathways at selected locations to provide electrical contact with the pathways.

Observation of the optical micrographs in FIG. 9A and FIG. 10A may elucidate the difference in damage sensing versus strain sensing between the MWCNT nanoparticles 661 and the xGnP nanoparticles 663. As indicated by FIG. 9A, the MWCNT nanoparticles 661 appear to be dispersed across the fiber lamina and penetrates within the fiber bundles to form an electrically conductive, non-invasive in situ network throughout the substrate 630. The MWCNT nanoparticles 661 may preferentially form conductive pathways along the fiber direction.

The xGnP nanoparticles 663, as indicated in FIG. 10A, do not penetrate the fiber bundles, in this Example, so that the xGnP nanoparticles 663 create an electrically conductive network adhered atop the substrate 630 with minimal penetration and with reduced sensitivity compared to the carbon nanotube sensor.

Illustrations of the microstructure are included to aid in the visualization of the deposited MWCNT nanoparticle 661 sensor network and xGnP nanoparticle 663 sensor network in FIG. 9B and FIG. 10B. Lower xGnP nanoparticle sense baseline resistance values may be the result of a higher concentration of conductive nanomaterial being confined to a limited space on top of the substrate 630.

Hierarchically structured patterns of nanoparticles may be deposited onto fabrics formed of non-conductive fibers by an ink jet printing process using an ink jet printer with nanoparticle printer ink. While the electrophoretic and screen hybridization approaches may require specific geometries or screens, respectively, to form patterns, inkjet printing may be used to form patterns of nanoparticles on a variety of substrates including non-conductive substrates form of non-conductive fibers. The nanoparticles in the patterns formed by inkjet printing may include carbon nanotube, graphene, or combinations of carbon nanotube and graphene. The patterns may form electrical circuits for applications such as flexible electronics, solar cells, sensors, strain gauges, and electroluminescent displays.

A nanoparticle dispersion with carbon nanotubes as the nanoparticle may be specifically formulated to have low viscosity. After oxidation of the nanoparticles, the nanoparticles may be functionalized by the attachment of chemical groups to the surface of the nanoparticle to improve the adhesion between the nanoparticle and the fiber surface of the non-conductive fibers forming the fabric upon which the nanoparticles are deposited. After a stable nanoparticle dispersion is obtained, a variety of additives may be added to the nanoparticle dispersion to enable wetting of the fabric surface or to modify the viscosity of the nanoparticle dispersion. The resultant nanoparticle dispersion may form the nanoparticle printer ink. The nanoparticle printer ink may be applied to the fabric, which is the substrate in this implementation, by use of the inkjet printer.

Use of inkjet printing to apply the nanoparticle printer ink to fabric, which is the non-conductive substrate in this implementation, may enables higher resolution patterning of the patterns of nanoparticles in comparison with either EPD or the screen printing process. Inkjet printing of patterns with nanoparticle printer ink may offer more flexibility in the design of the electrically conductive networks than either EPD or the screen printing processes. In various implementations, inkjet printing of patterns of nanoparticle printer ink may be industrially scalable.

Figure 14:
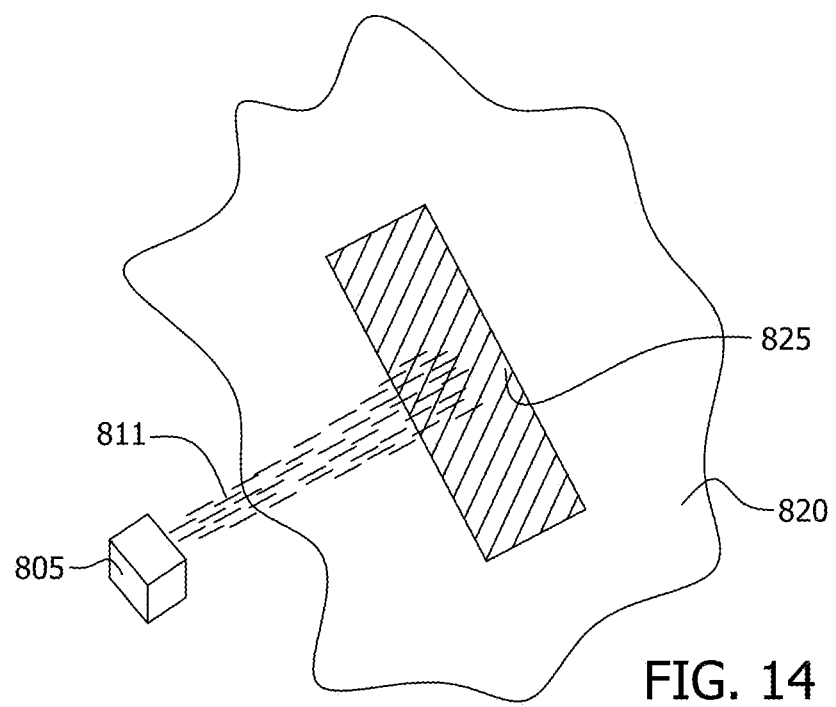
FIG. 14 illustrates by perspective view an exemplary application of nanoparticle printer ink onto a non-conductive substrate by an inkjet printer.

As illustrated in FIG. 14, the nanoparticle printer ink 811 may form an aerosol as the nanoparticle printer ink 811 is dispensed from the inkjet printer 805 onto the non-conductive substrate 820, and the non-conductive substrate 820 may have a static electric charge to attract the functionalized nanoparticles in the aerosolized nanoparticle printer ink 811 to the non-conductive substrate 820. Nanoparticle printer ink 811 forms pathway 825 on non-conductive substrate 820, as illustrated in FIG. 14. Aerosol may include a single droplet or single particle in gas including air.

Figure 13:
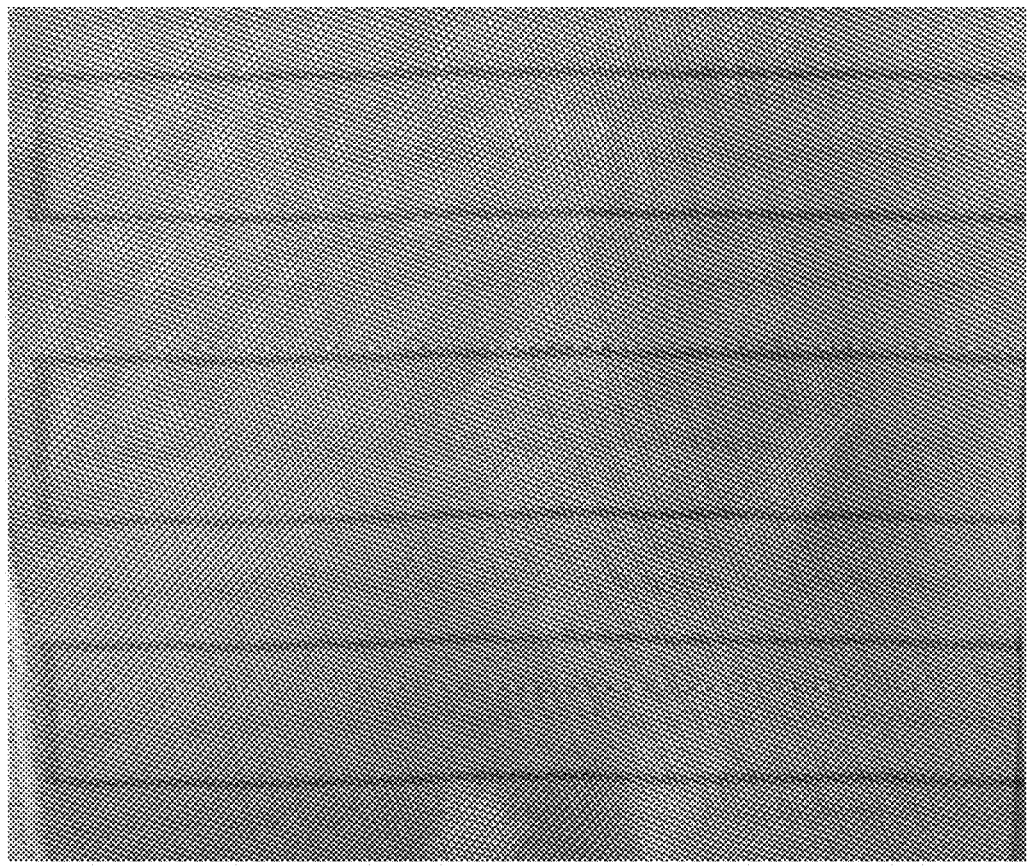
FIG. 13 constitutes a photograph showing an exemplary pattern comprising nanoparticles printed onto an electrically non-conductive woven glass fabric.

FIG. 13 illustrates a pattern comprising nanoparticles printed onto an electrically non-conductive woven glass fabric in a rectangular pattern by an inkjet printer. The pattern appears as the darker lines in the photograph. The functionalized nanoparticle dispersion 128 of Example 1 was used at the nanoparticle printer ink in the implementation of FIG. 13. Key processing parameters may include the droplet size, solution concentration, and motion of the inkjet head. Different processing conditions result in varying nanotube morphologies on the fabric. Control of the process enables tailoring of the percolating structure to achieve desired electrical properties.

Figure 15A:
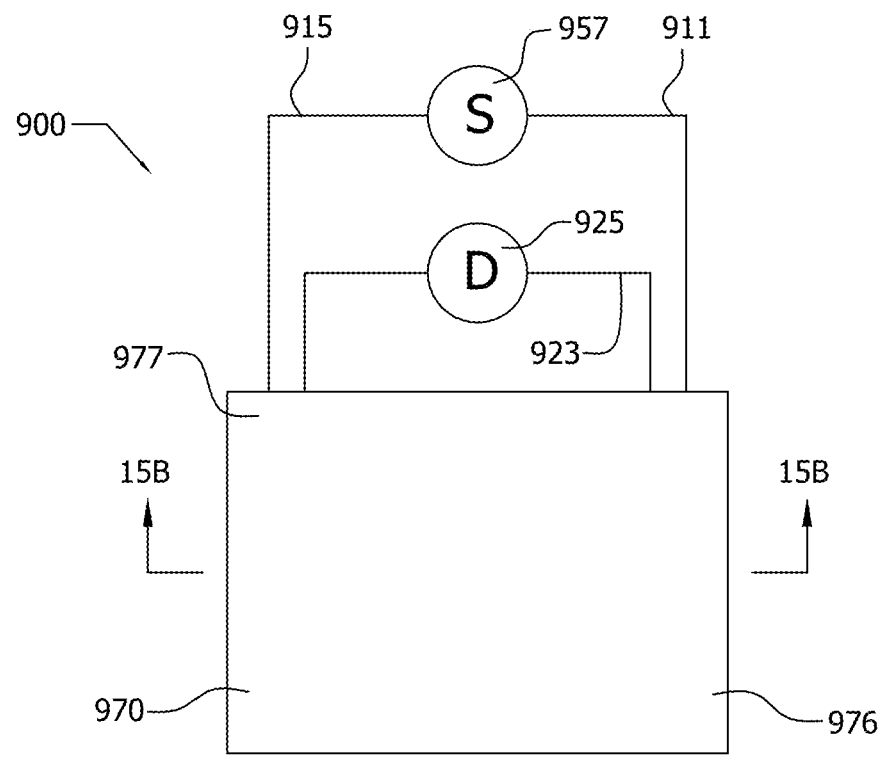
FIG. 15A illustrates by schematic diagram an exemplary sensor comprising conductive nanoparticles received within a porous non-conductive substrate; and, FIG. 15B illustrates by schematic cross-sectional view portions of the exemplary sensor of FIG. 15A.
Figure 15B:
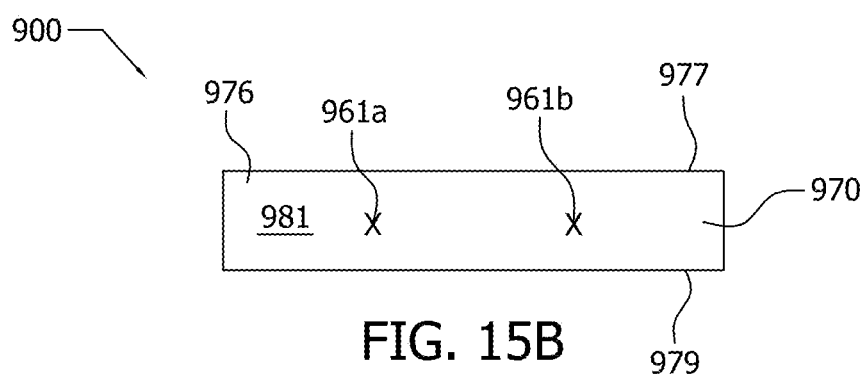

As illustrated in FIGS. 15A, 15B, sensor 900 includes substrate 976 that defines surfaces 977, 979, nanoparticles, such as nanoparticles 461a, 461b, source 957 and detector 925. Substrate 976 is porous and non-conductive, in this implementation. Nanoparticles, such as nanoparticles 461a, 461b, are disposed within interior 981 of substrate 976 between surfaces 977, 979 to form at least portions of sensor element 970, as illustrated in FIG. 15B. The nanoparticles, such as nanoparticles 461a, 461b, may be functionalized and conductive, and may be deposited onto substrate 976 by a process such as process 100, 700.

As illustrated in FIG. 15A, source 957 communicates with substrate 976 by pathway 911 to apply potential 915 to sensor element 970. In various implementations, potential 915 may be, for example, a constant voltage, a constant amperage, a magnetic field, or an electromagnetic field, as would be readily recognized by those of ordinary skill in the art upon study of this disclosure. Although pathway 911 is illustrated as a discrete pathway for purposes of explanation, pathway 911 may include multiple pathways and/or pathway 911 may be in the form of a magnetic field or an electromagnetic field, as would be readily recognized by those of ordinary skill in the art upon study of this disclosure. Detector 925 communicates operatively with sensor element 970 to measure electrical properties 927 including changes in electrical properties 927 of potential 915 through at least portions of sensor element 970, as illustrated. Electrical properties 927 may be, for example, a resistivity, a capacitance, or an inductance of at least portions of sensor element 970, and changes in electrical properties 927 may be changes in the resistivity, the capacitance, or the inductance of at least portions of at least portions of sensor element 970, as would be readily recognized by those of ordinary skill in the art upon study of this disclosure. It is posited that changes in electrical properties 927 of at least portions of sensor element 970 may result from alteration of quantum tunneling between the nanoparticles of sensor element 970. For example, alteration of quantum tunneling between nanoparticles 961a, 961b may result from mechanical distortion of sensor element 970 or from material deposition (e.g., vapor deposition) onto sensor element 970.

In various implementations, the processes disclosed herein may include the steps of forming screen ink comprising a nanoparticle dispersion, making a stencil, the stencil allowing the selective passage of the screen ink through the stencil to form pathways in the substrate, and forming pathways of nanoparticles in the fabric by applying the screen ink to the fabric with the stencil interposed between the screen ink and the fabric.

In various implementations, the processes disclosed herein may include the steps of formulating nanoparticle printer ink comprising a nanoparticle dispersion, and depositing hierarchically structured patterns of functionalized nanoparticles upon a fabric by inkjet printing of the nanoparticle printer ink onto the fabric using an inkjet printer.

In various implementations, the processes disclosed herein may form related composition of matter, comprising functionalized nanoparticles bonded to a surface of a non-conductive fiber, the surface of the non-conductive fiber comprising a sizing adhered to the surface of the non-conductive fiber. The composition of matter may further comprise an electric field disposed about the non-conductive fiber. In the composition of matter, the functionalized nanoparticles bonded to the surface of the non-conductive fiber forming a uniform coating upon the non-conductive fiber. The functionalized nanoparticles in the various compositions of matter may include nanoparticles functionalized with polyethyleneimine (PEI) bonded to oxidized carbon atoms on surfaces of the nanoparticles, the nanoparticles selected from a group consisting essentially of carbon nanotubes and graphene. The functionalized nanoparticles in the various compositions of matter may include nanoparticles functionalized with oxidized carbon atoms on surfaces of the nanoparticles, the nanoparticles selected from a group consisting essentially of carbon nanotubes and graphene, and the oxidized carbon atoms formed by ozonolysis of the nanoparticles.

In various implementations, the processes disclosed herein may include detecting a change in an electrical property of a sensor element resulting from an alteration in the quantum tunneling between the nanoparticles, the sensor element being formed from conductive nanoparticles deposited within pores of a porous non-conductive substrate.

The foregoing discussion along with the Figures discloses and describes various exemplary implementations. These implementations are not meant to limit the scope of coverage, but, instead, to assist in understanding the context of the language used in this specification and in the claims. The Abstract is presented to meet requirements of 37 C.F.R. § 1.72(b) only. Accordingly, the Abstract is not intended to identify key elements of the processes, and related apparatus and compositions of matter disclosed herein or to delineate the scope thereof. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A sensor, comprising:
    a substrate that is porous and non-conductive;
    nanoparticles deposited upon surfaces of pores within an interior of the substrate to form a sensor element that is dry, wherein the nanoparticles are electrically conductive; and
    a detector in operable communication with the sensor element to measure a change in an electrical property of the sensor element.

2. The sensor of claim 1, wherein the nanoparticles comprise carbon.

3. The sensor of claim 1, wherein the nanoparticles comprise a metal.

4. The sensor of claim 1, wherein the substrate comprises cellulose.

5. The sensor of claim 1, further comprising:
    a voltage source in communication with the sensor element.

6. The sensor of claim 5, wherein the voltage source applies a constant voltage across at least portions of the sensor element.

7. The sensor of claim 5, wherein the voltage source flows a constant current through at least portions of the sensor element.

8. The sensor of claim 1, wherein the electrical property measured by the detector is selected from a group consisting of resistivity, capacitance, and inductance.

9. The sensor of claim 1, wherein the change in the electrical property of the sensor element is caused by straining of the sensor element.

10. A sensor, comprising:
    a substrate comprised of fibers, the substrate is porous and non-conductive;
    nanoparticles deposited upon the fibers within an interior of the substrate to form a sensor element that is dry, wherein the nanoparticles are electrically conductive;
    a detector in operable communication with the sensor element to measure a change in an electrical property of the sensor element.

11. The sensor of claim 10, wherein the fibers comprise a material selected from a group consisting of glass, aromatic polyamide (aramid), polyethylene terephthalate (polyester) and cellulose.

12. The sensor of claim 10, wherein the nanoparticles comprise carbon.

13. The sensor of claim 10, wherein the nanoparticles adhere to the surfaces by covalent bond between the nanoparticles and the fibers.

14. The sensor of claim 10, wherein the electrical property measured by the detector is selected from a group consisting of resistivity, capacitance, and inductance.

15. The sensor of claim 10, further comprising the step of: wherein the change in the electrical property is caused by straining of the sensor element.

16. A method of sensing with a sensor including a sensor element, comprising the steps of:
    inducing an electric field through a substrate that is porous and non-conductive;
    contacting a nanoparticle dispersion with the substrate, the nanoparticle dispersion comprising functionalized nanoparticles having a charge;
    drawing the functionalized nanoparticles into pores within an interior of the substrate using the electric field;
    depositing the functionalized nanoparticles onto upon surfaces of the substrate within the pores;
    withdrawing the substrate from contact with the nanoparticle dispersion;
    drying the substrate thereby forming said sensor element that is dry, wherein said sensor element comprises the substrate with the functionalized nanoparticles disposed upon surfaces of the substrate within the interior of the substrate; and
    detecting a change in an electrical property of said sensor element.

17. The method of claim 16, further comprising the step of:
    deforming said sensor element thereby causing a change in an electrical property of said sensor element.

18. The method of claim 16, wherein the nanoparticles comprise carbon.

19. The method of claim 16, wherein the substrate comprises cellulose.

20. The method of claim 16, wherein the electrical property of said sensor element is selected from a group consisting of resistivity, capacitance, and inductance.

* * * * *